US007650500B2

(12) United States Patent
Matoba

(10) Patent No.: US 7,650,500 B2
(45) Date of Patent: Jan. 19, 2010

(54) ENCRYPTION COMMUNICATION SYSTEM

(75) Inventor: Kazumine Matoba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 11/050,660

(22) Filed: Feb. 3, 2005

(65) Prior Publication Data

US 2006/0090074 A1    Apr. 27, 2006

(30) Foreign Application Priority Data

Oct. 22, 2004   (JP) .............................. 2004-308395

(51) Int. Cl.
*H04L 29/06* (2006.01)
(52) U.S. Cl. .......................................... 713/163; 726/2
(58) Field of Classification Search ................ 380/30, 380/43, 268; 375/214; 709/202, 217; 713/163, 713/182, 168, 180; 726/5, 2; 705/26; 455/41
See application file for complete search history.

(56) References Cited

U.S. PATENT DOCUMENTS

| 5,325,433 | A  | * | 6/1994  | Torii et al. ..................... 380/30 |
| 5,347,632 | A  | * | 9/1994  | Filepp et al. ................. 709/202 |
| 5,500,898 | A  | * | 3/1996  | Nankaku ..................... 380/43 |
| 6,079,020 | A  | * | 6/2000  | Liu ............................. 709/202 |
| 6,961,366 | B1 | * | 11/2005 | Bendak et al. .............. 375/214 |
| 7,024,553 | B1 | * | 4/2006  | Morimoto ................... 713/163 |
| 7,111,172 | B1 | * | 9/2006  | Duane et al. ................ 713/182 |
| 7,117,526 | B1 | * | 10/2006 | Short ............................. 726/5 |
| 7,127,496 | B2 | * | 10/2006 | Isozu et al. ................. 709/217 |
| 7,152,160 | B2 | * | 12/2006 | Lantto et al. ................ 713/168 |
| 7,222,088 | B2 | * | 5/2007  | Nishikado et al. ............. 705/26 |
| 7,362,864 | B2 | * | 4/2008  | Kryzak et al. ............... 380/268 |
| 7,363,500 | B2 | * | 4/2008  | Funk ........................... 713/180 |
| 2004/0248514 | A1 | * | 12/2004 | Idani et al. ................. 455/41.2 |

FOREIGN PATENT DOCUMENTS

JP          7-107084       4/1995
JP         2003-069597     3/2003

OTHER PUBLICATIONS

Gunter M; Internet service monitoring with mobile agents; May/Jun. 2002; Bern University; vol. 16, issue 3; pp. 22-29.*

* cited by examiner

*Primary Examiner*—Michael J Simitoski
*Assistant Examiner*—Monjour Rahim
(74) *Attorney, Agent, or Firm*—Katten Muchin Rosenman LLP

(57) ABSTRACT

An encryption communication system, comprising a communication relay device that connects a first network and a second network, for encrypting a communication within the first network and a communication within the second network in a network system configured so that communications are performed between a client in the first network and a server in the second network via the communication relay device, wherein the communication relay device comprises key generation unit generating an encryption key and a decryption key with respect to the client, and key transfer unit transmitting the encryption key and the decryption key to the server, and the server comprises frame receiving unit decrypting a receipt frame by use of the decryption key, and frame transmitting unit encrypting the frame by use of the encryption key and thus transmitting the frame.

2 Claims, 25 Drawing Sheets

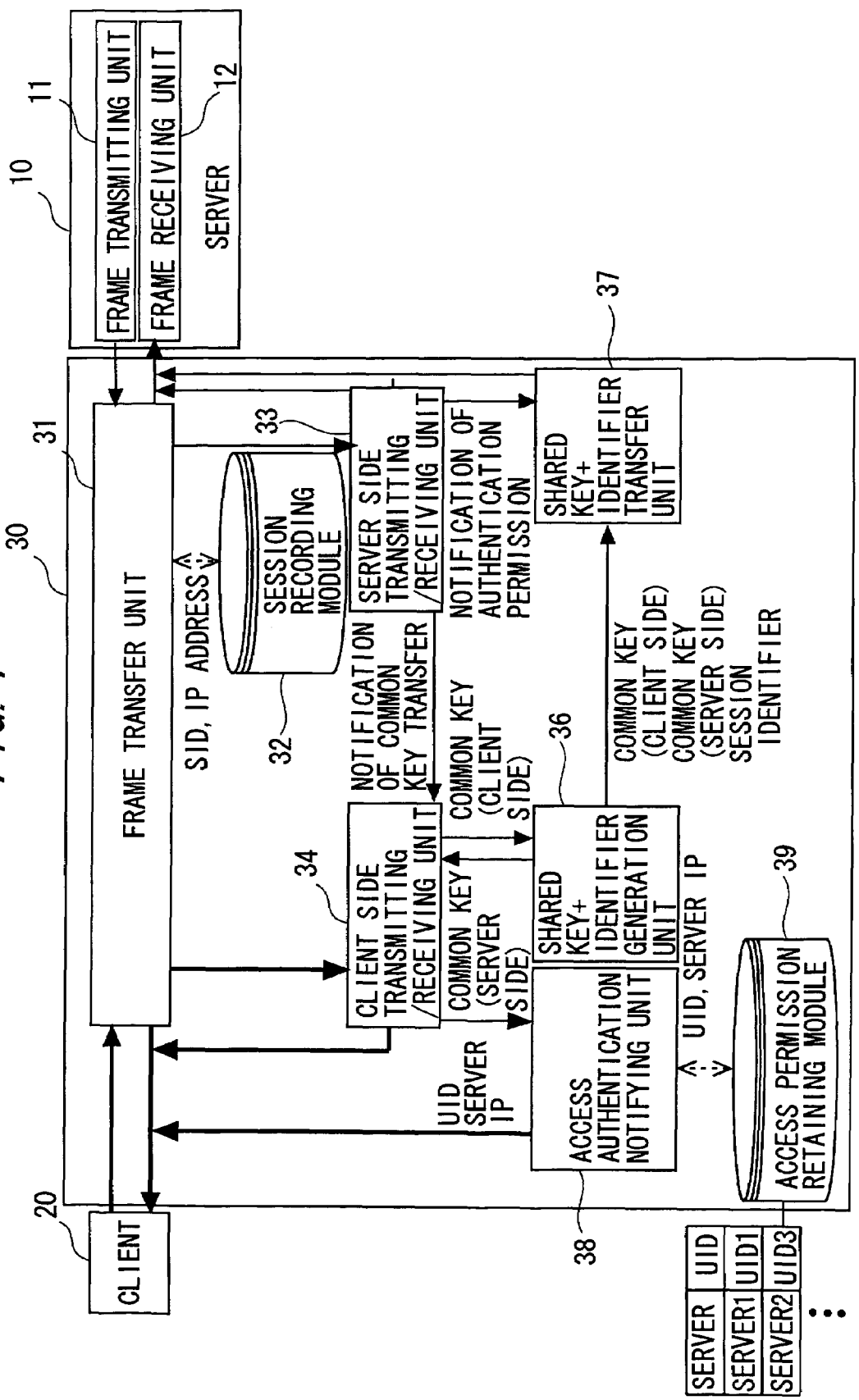

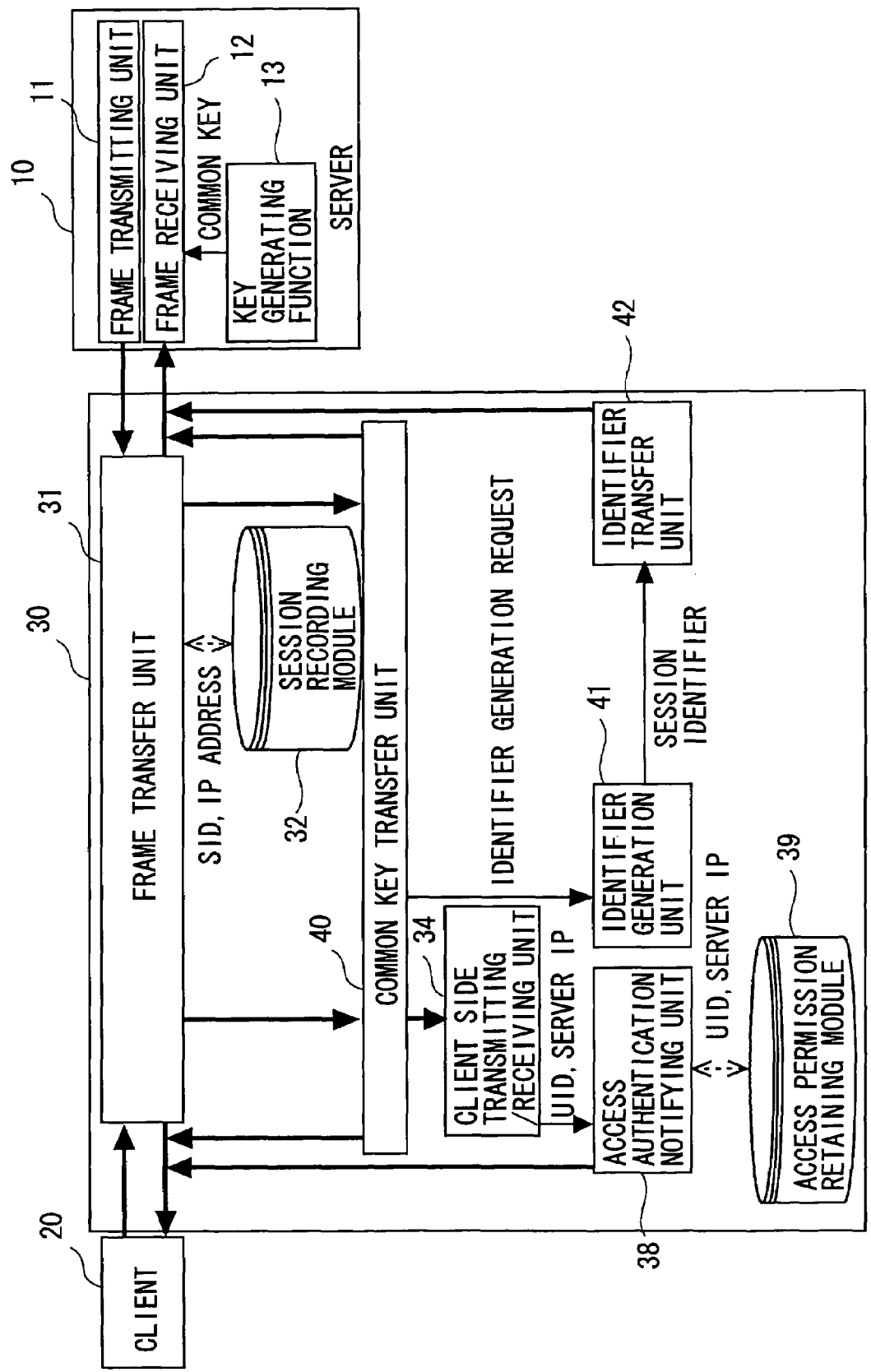

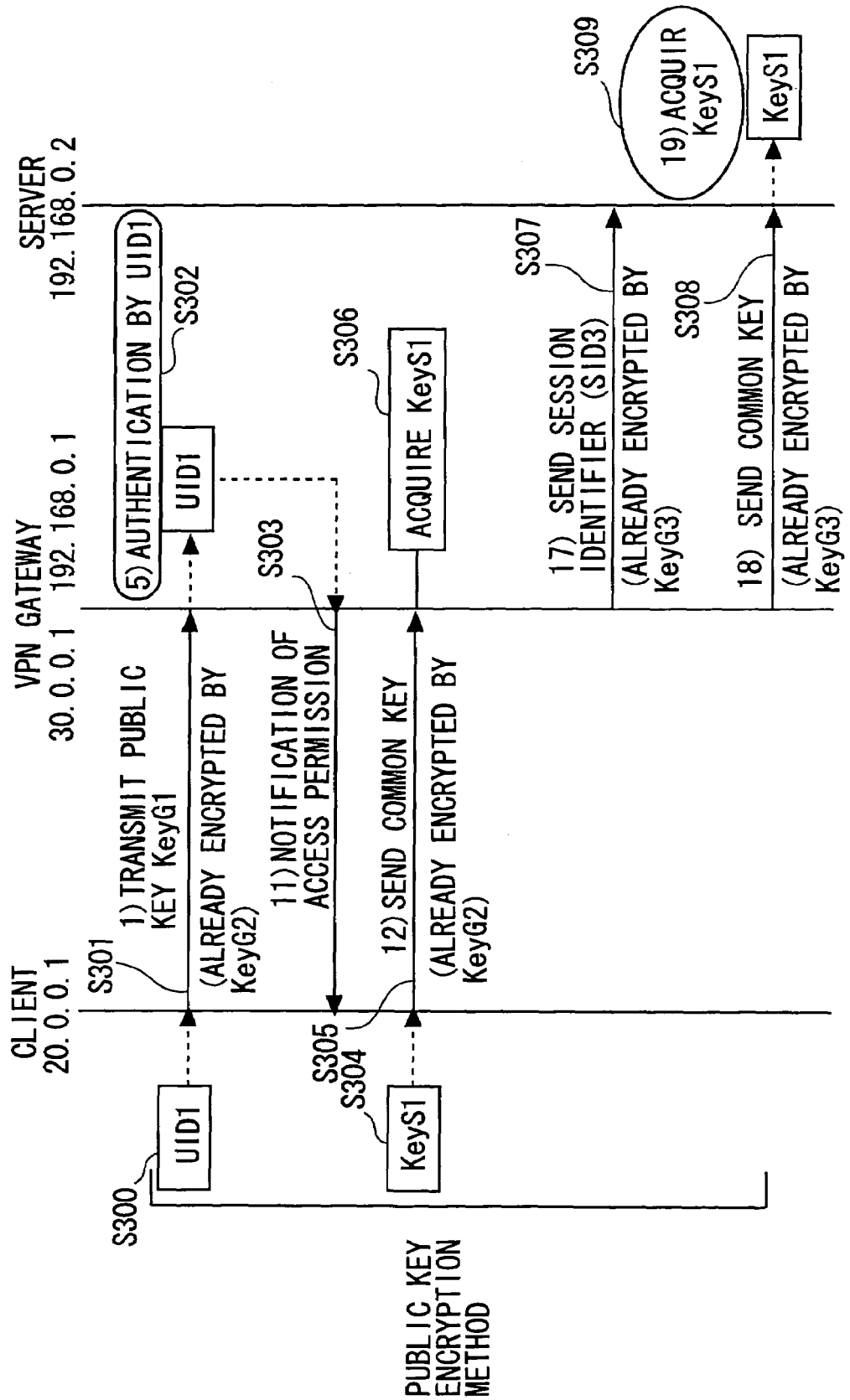

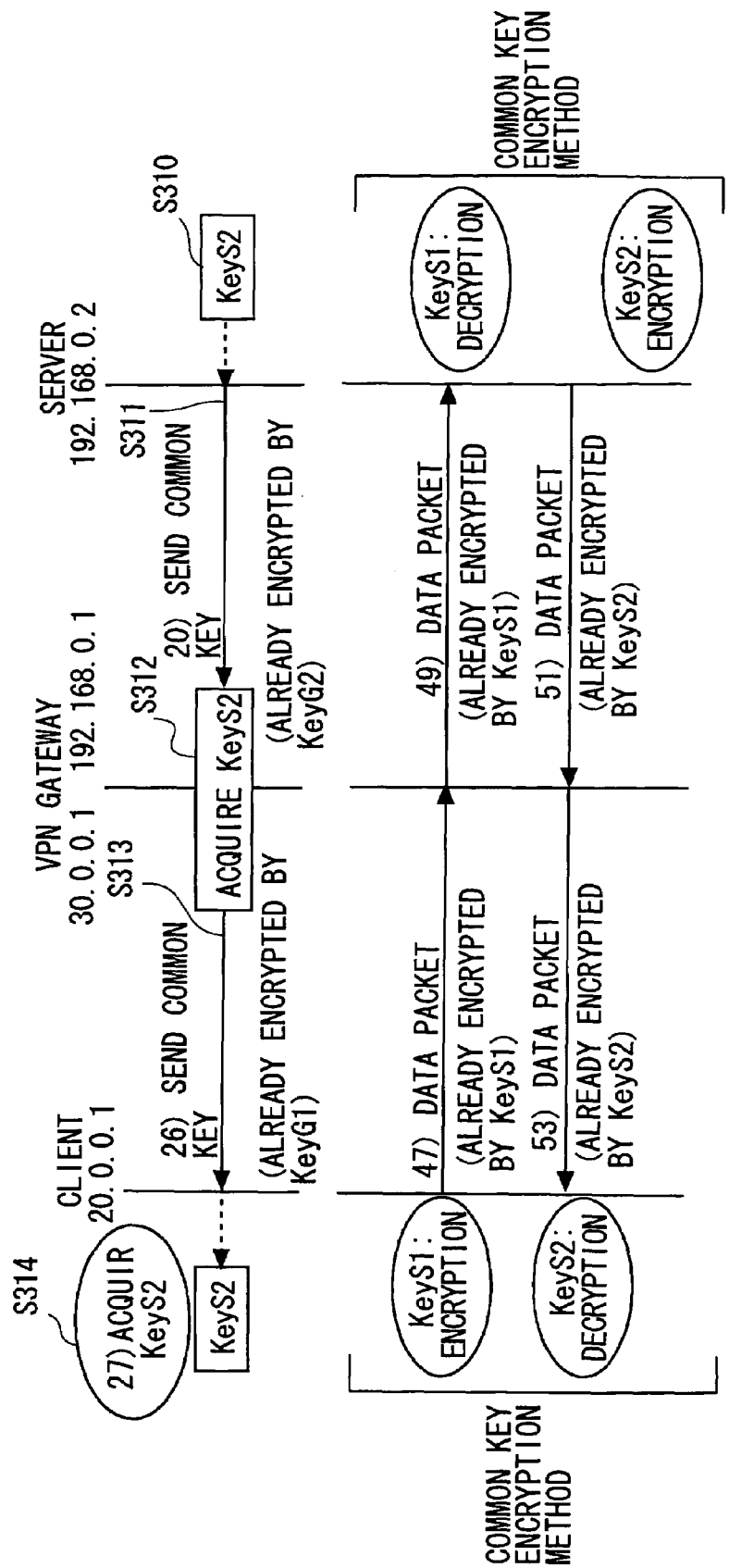

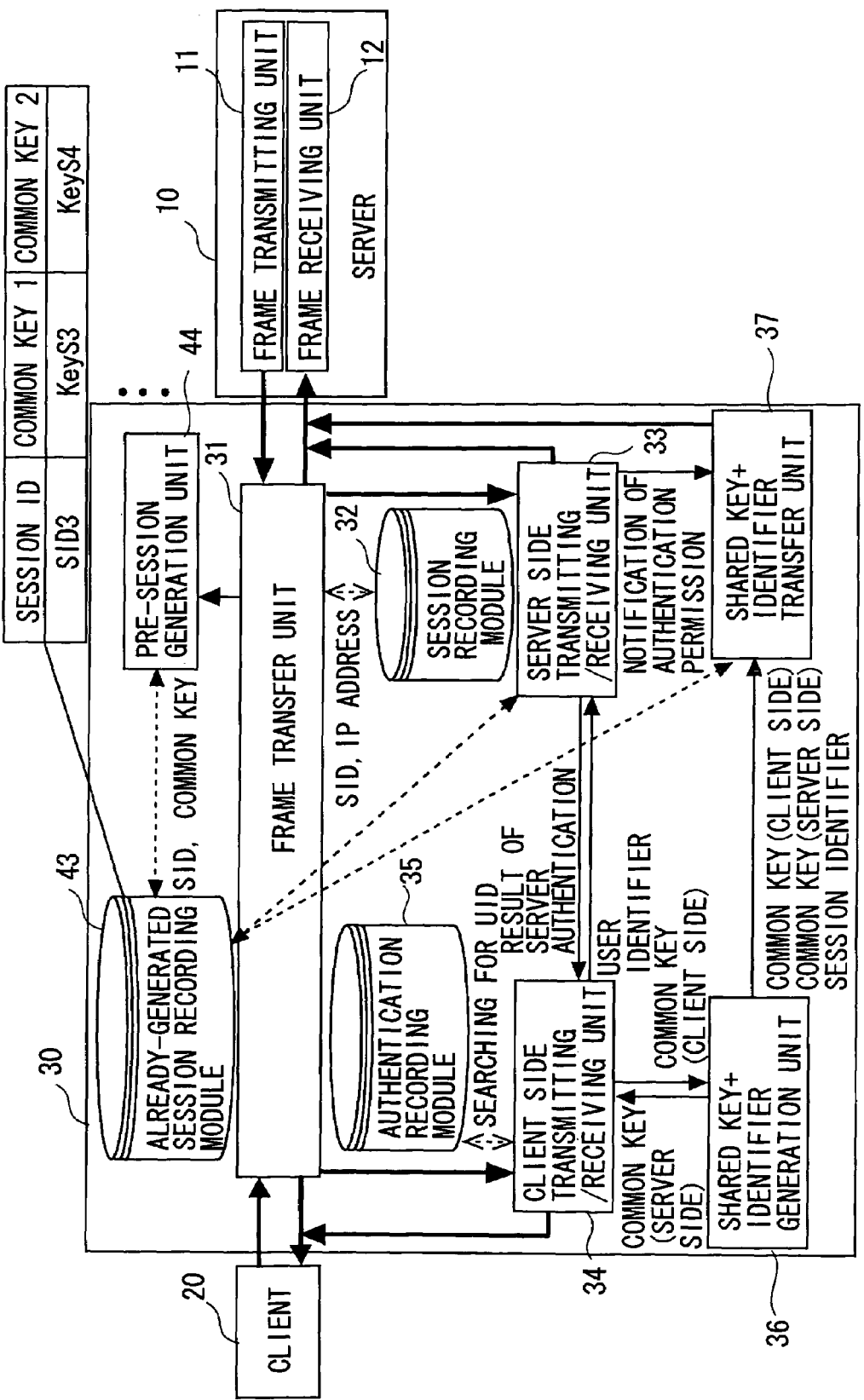

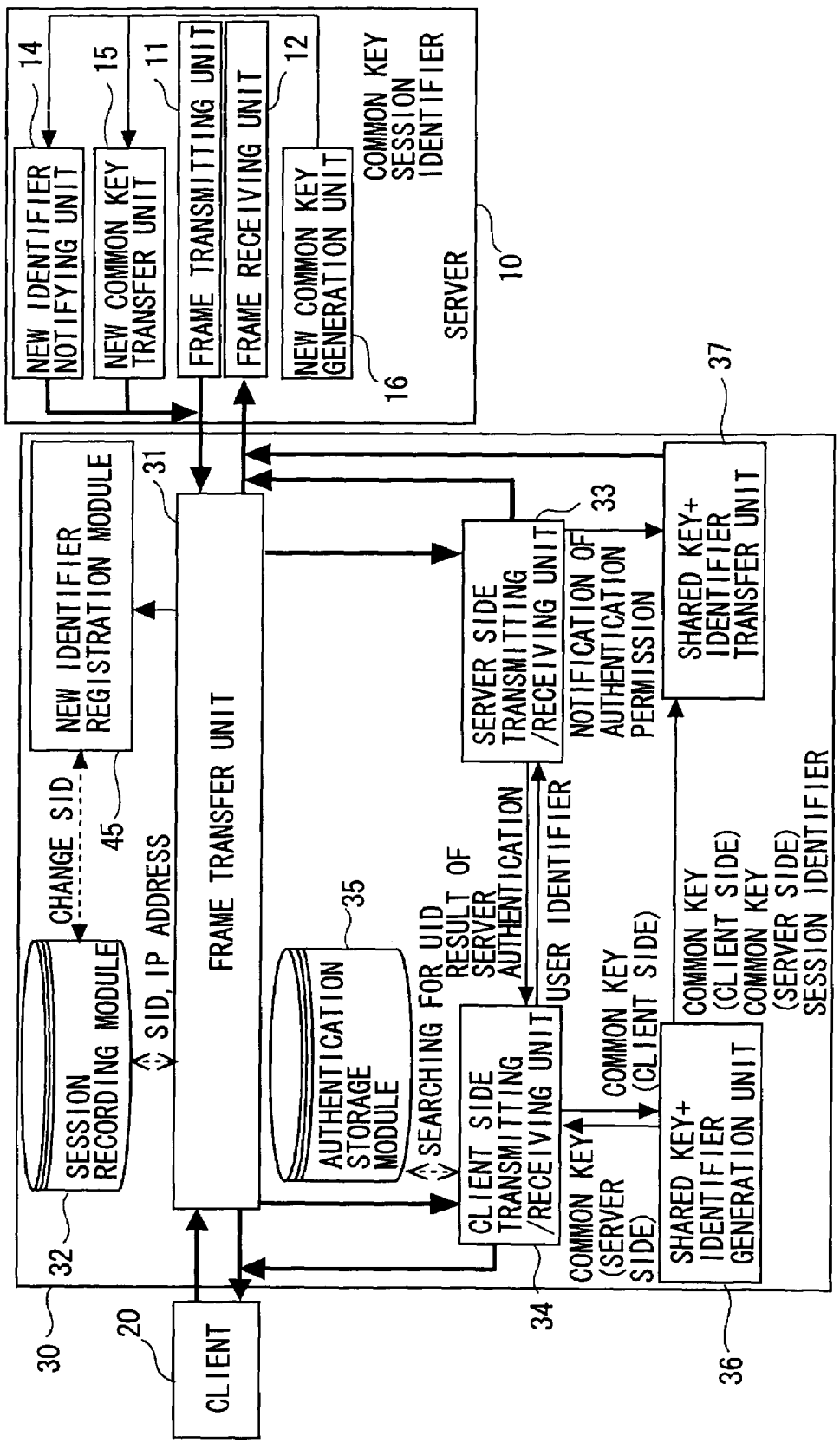

FROM FIG. 12A

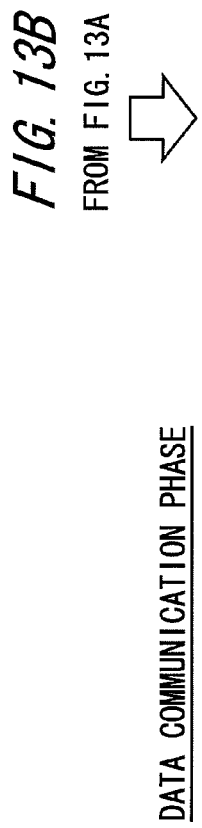

ENCRYPTION COMMUNICATION SYSTEM

CROSS REFERENCE TO RELATED APPLICATION

The present application claims priority from Japanese Patent Application No. 2004-308395, filed Oct. 22, 2004, the entire contents of which are incorporated by reference herein.

BACKGROUND OF THE INVENTION

The invention relates to an encryption communication system, including a communication relay device that connects a first network and a second network, for encrypting a communication within the first network and a communication within the second network in a network system configured so that communications are performed between a client in the first network and a server in the second network via the communication relay device.

A VPN (Virtual Private Network) technology capable of encrypting authentication/data communications is employed as a technology, a so-called remote accessing technology, for a client existing in a remote area to perform communications with a host/server within the Intranet via the Internet.

The VPN provides a structure (framework) by which the client existing in the remote area can communicate directly with the host/server in the Intranet. A general type of remote access actualizing method is that a VPN gateway device is installed at a connection point between the Internet and the Intranet, and a virtual line (VPN tunnel) is generated between the client and the VPN gateway (see FIG. 10).

A VPN configuration technology for effecting such encryption is exemplified by IPSec (Internet Protocol Security: Security Architecture for Internet Protocol), SSL-VPN (Secure Socket Layer VPN) and so on.

In the case of establishing a connection between the remote areas by the VPN tunnel via the Internet, there might be a possibility of suffering attacks such as eavesdropping, falsification, posing (spoofing) and so on by ill-intentioned people because of via the public network. A frame sent across within the Internet is required to be invariably encrypted for safeguarding traffic from these attacks irrespective of whether authentication communication or data communication.

For encrypting the traffic in the VPN tunnel, the VPN gateway device and the client have a function of generating (establishing) an encryption session, and encrypting and decrypting the traffic passing through the session.

Namely, an encryption-side device converts data of the frame to be transmitted into a bit string impossible of being decrypted, while a decryption-side device decodes the data back to the bit string possible of being decrypted. The bit string used as a rule for converting the frame data is called a [key].

The encryption VPN communications using the key can be roughly categorized into two phases. These phases are an authentication phase and a data communication phase. In the authentication phase, there are executed processes of making authentication, determining the key utilized in the data communication phase and so on. In the data communication phase, there are executed processes of transmitting and receiving the encrypted frame by use of the key determined in the authentication phase, and so forth.

If holding the [key], it is possible to decrypt the encrypted communication in the data communication phase, and hence it is an indispensable condition for the encryption VPN technology to prevent the [key] from being leaked out to terminals other than the frame transmitting/receiving host.

A technology such as a public key encryption method, etc is given as a method of sharing the common key with between the client and the VPN gateway in a way that meets the condition described above.

The public key encryption method is an encryption method capable of preventing the key from being decrypted by preparing two types of keys such as an encryption key and a decryption key and making the encryption key open to the public (a public key) while retaining the decryption key without being opened (a secret key).

There is a common key encryption method different from the public key encryption method, wherein a key usable for both of the encryption process and the decryption process is prepared. The common key encryption method is an encryption method of exchanging the key information between two hosts performing the communications and sharing the same key (a common key) with each other.

The public key encryption method has a heavier load of the encryption/decryption processes than the common key encryption method, and therefore the common key encryption method is utilized in the data communication phase requiring a large number of encryption/decryption processes. Key exchange algorithms in the respective methods are described in a variety of documents (refer to, e.g., Non-Patent documents 1 and 2). The invention relates to an authentication/data communication encryption technology in the VPN described above.

Note that the VPN utilizing method includes, other than [the remote access VPN], a utilizing mode called a [base-to-base VPN], wherein a plurality of networks, which are physically apart from each other, are made to appear as if one single network (see FIG. 11).

The following discussion will proceed on the premise of the [remote access VPN], however, the application of the invention in the [base-to-base VPN] is not restricted.

At the present time, computerization in organizations such as business enterprises, public offices, etc gains a progress, and there increase the organizations in which information such as customer individual information, etc accessible by only some members within the organizations are stored on servers in the Intranets.

Accordingly, the mere VPN-based encryption within the Intranet is insufficient as a countermeasure in security, and the traffic inside the Intranet needs encrypting, thereby necessitating the information to be protected from the malicious attacks.

As explained above, in the case of actualizing the encryption both in the Intranet and in the Internet, any one of the following types of encryption is to be conducted in addition to the encryption of the session between the VPN gateway and the client.

In the case of a prior art 1 (see FIG. 12A and FIG. 12B), in the authentication phase, the encryption sessions are generated (established) between the client and the VPN gateway and between the VPN gateway and the server, respectively. In the data communication phase, the VPN gateway, when receiving the frame from the client, decrypts the frame once with a client-side common key, then encrypts the frame with a server-side common key, and transmits the encrypted frame to the server. The VPN gateway, when receiving the frame from the server, decrypts the frame with the server-side common key, then encrypts the frame with the client-side common key, and transmits the encrypted frame to the client.

In the case of a prior art 2 (see FIG. 13A and FIG. 13B), in the authentication phase, the encryption sessions are generated between the client and the VPN gateway and between the client and the server, respectively. In the data communication phase, the VPN gateway, when receiving the frame from the client, decrypts the frame with the client-side common key and sends the frame to the server. The VPN gateway, when receiving the frame from the server, encrypts the frame with the client-side common key and sends the frame to the client.

Thus, the VPN gateway in each of the prior arts 1 and 2 requires the processes of encrypting and decrypting all the frames passing through in the data communication phase.

The VPN gateway resides at a boundary between the Internet and the Intranet and is therefore in an easy-to-concentrate position of the traffic.

Further, it is considered that a much greater amount of traffic passes through the VPN gateway from now onward because of an increase in quantity of information (data size) that can be processed by a single host owing to client/server enhanced performance and a rise in the number of users who utilize the Internet.

The encryption/decryption process essentially involves a great calculated amount and is one of processes that consume a large quantity of CPU resources. As described above, the VPN gateway executes this kind of encryption/decryption processes for all the frames passing through the VPN gateway.

Accordingly, if the traffic concentrates at the VPN gateway, there arises a problem that the encryption/decryption process by the VPN gateway turns out a bottleneck in end/host communications.

Note that the following is what is considered to be related to the invention (refer to Non-Patent documents 1 and 2).

[Non-Patent document 1]
"Mastering IPSec", authored By Tatuya Baba, published by Orly Japan
[Non-Patent document 2]

SUMMARY OF THE INVENTION

The invention was devised in view of the problems about the aforementioned scalability/performance of the VPN gateway and aims at providing a technology for reducing a load of the encryption/decryption processes of a communication relay device (e.g., the VPN gateway) that connects a first network (e.g., the Internet) and a second network (e.g., the Intranet).

The invention was devised to solve the problems and takes the following configurations.

An encryption communication system comprises a communication relay device that connects a first network and a second network and serves to encrypt a communication within the first network and a communication within the second network in a network system configured so that communications are performed between a client in the first network and a server in the second network via the communication relay device, the communication relay device comprising key generation unit generating an encryption key and a decryption key with respect to the client, and key transfer unit transmitting the encryption key and the decryption key to the server, the server comprising frame receiving unit decrypting a receipt frame by use of the decryption key, and frame transmitting unit encrypting the frame by use of the encryption key and thus transmitting the frame.

According to the invention, (as will be explained in, for instance, a first embodiment, in an authentication phase,) the communication relay device (e.g., a VPN gateway 30 in the embodiments) transfers the encryption key and the decryption key to the server. Therefore, in a data communication phase afterward, the encryption/decryption processes can be executed between the server and the client (without executing the encryption/decryption processes by the communication relay device). This eliminates the necessity for the encryption/decryption processes by the communication relay device in the data communication phase. It is therefore possible to reduce a processing load on the communication relay device in the data communication phase.

In the encryption communication system, for example, the communication relay device comprises identifier generation unit generating a session identifier for identifying an encryption session between the client and the server, identifier transfer unit transmitting the session identifier to the client and the server, identifier extraction unit extracting the session identifier from the receipt frame, and frame transfer unit transferring the receipt frame to the client or the server on the basis of the session identifier extracted from the receipt frame and a source address of the receipt frame, wherein the server and the client send the encrypted frame in a way that assigns the session identifier to the frame.

Thus, when introducing the session identifier for uniquely identifying the encryption session, the communication relay device can identify the encryption session, so that the communications can be performed even in such a condition that the client is unable to have a direct access to the server (for example, an IP address thereof can not be referred to).

In the encryption communication system, for instance, the communication relay device comprises access permission retaining unit retaining access permission information of an access to the second network and access permission information of an access to the server for every user, and access authentication notifying unit transmitting a frame for notifying of access permission or access rejection, wherein the communication relay device, when receiving authentication data of the user from the client, authenticates a user access to the second network and a user access to the server on the basis of the access permission information of the access to the second network and the access permission information of the access to the server.

This scheme eliminates the necessity for an access request and a response frame thereto between the client and the communication relay device and between the communication relay device and the server. It is therefore feasible to reduce the encryption/decryption processes of the communication relay device to a greater degree.

In the encryption communication system, for example, the communication relay device comprises key transparent transfer unit transferring a key transfer frame as substitute for the key generation unit and the key transfer unit, the server has a key generation function of generating an encryption key and a decryption key with respect to the client, and the key transparent transfer unit transfers, when the communication relay device receives the common key from the client, the common key to the server, and transfers, when the communication relay device receives the common key from the key generation unit, the common key to the client.

With this scheme, the encryption key and the decryption key are generated between the client and the server, and hence the communication relay device comes to have no necessity of executing a generation process of common key which is used in a data communication phase. This enables the load on the communication relay device to be decreased even when the traffic concentrates at the communication relay device because of there being a large number of servers and clients.

In the encryption communication system, for instance, the communication relay device comprises pre-session generation unit previously generating the encryption session with respect to the server, and already-generated session retaining unit retaining an identifier of the already-generated encryption session, and the communication relay device transfers the key to the server through the encryption session retained on the already-generated session unit.

This scheme enables repetitive use of the session between the communication relay device and the server. The encryption/decryption processes of the communication relay device can be thereby reduced. This is effective particularly when the plurality of clients access the same server.

In the encryption communication system, for example, the server comprises new common key generation unit generating a new common key and an identifier associated with this new common key, new common key transfer unit encrypting the common key with the pre-exchange common key and transmitting the encrypted common key together with the identifier, and new identifier notifying unit transmitting the identifier and the old identifier. The communication relay device comprises new identifier registration unit transferring, when receiving the frame containing the identifier, the identifier to the frame transfer unit. The new common key generation unit generates a common key and an identifier in the process of an encryption communication using the common key between the client and the server, the new common key transfer unit transmits the common key and the identifier to the client, and the new identifier notifying unit sends the two identifiers to the new identifier registration unit.

This scheme enables the client and the server to transmit and receive the frame by use of the new common key and the new session identifier. Further, the key in the data communication phase can be periodically changed between the client and the server, whereby there decreases a probability that the encrypted frame might be decrypted by the third party but increases the security in the data communication phase.

Moreover, the invention can be specified by way of the invention of a communication relay device as follows.

A communication relay device connecting a first network and a second network and relaying a frame transmitted and received between a client in the first network and a server in the second network, comprises key generation unit generating, based on a predetermined protocol, a key for encrypting a data communication between the client and the server, retaining unit retaining the generated key, and key transfer unit transmitting the retained key to the server at predetermined timing.

In the communication relay device, for example, the retaining unit further retains a session identifier for identifying a data communication session between the client and the server, and the key transfer unit further transmits the session identifier.

Furthermore, the invention can be specified by way of the invention of an encryption communication method as below.

An encryption communication method for encrypting a communication within a first network and a communication within a second network in a network system including a communication relay device that connects the first network and the second network and configured so that communications are performed between a client in the first network and a server in the second network via the communication relay device, comprises generating an encryption key and a decryption key with respect to the client by the communication relay device, transmitting the encryption key and the decryption key to the server by the communication relay device, decrypting a receipt frame by use of the decryption key by the server, and encrypting the frame by use of the encryption key and thus transmitting the frame by the server.

The encryption communication method, for instance, further comprises generating a session identifier for identifying an encryption session between the client and the server by the communication relay device, transmitting the session identifier to the client and the server by the communication relay device, extracting the session identifier from the receipt frame by the communication relay device, transferring the receipt frame to the client or the server on the basis of the session identifier extracted from the receipt frame and a source address of the receipt frame, and sending the encrypted frame by the server and the client in a way that assigns the session identifier to the frame.

Next, the principle of the invention will be described with reference to the drawings.

FIGS. 14A, 14B and 15 are explanatory diagrams showing the principle of the invention. Respective devices shown in the FIGS. 14A, 14B and 15 have the following functions. A VPN gateway device mainly has a key generation function and a key transfer function. The key generation function is a function of generating an encryption key and a decryption key for the encryption communications with the client. The key transfer function is a function of transmitting to the server the encryption key and the decryption key that are generated with respect to the client.

The server mainly has a frame receiving function and a frame transmitting function. The frame receiving function is a function of decrypting the receipt frame by use of the decryption key received from other device. The frame transmitting function is a function of encrypting the transmission data with the encryption key and transmitting the frame.

Further, in the case of generating the VPN to the Intranet from the Internet, there is a general condition that the client is unable to directly refer to an IP address of the server. In this case, both of the client and the server send the frame addressed to the VPN gateway, and therefore the VPN gateway can not determine a destination of the frame only from a destination address of the frame. In this case also, the session identifier for uniquely identifying the encryption session is utilized for enabling the communications.

Hence, the VPN gateway device further has the identifier generation function of generating the identifier for uniquely identifying the encryption session, the identifier transfer function of transmitting the identifier to the server, and the frame transfer function of transferring the frame addressed to the client or the server on the basis of the identifier and the source address that are attached to the receipt frame.

Moreover, the server, when the frame transmitting function transmits the frame (which is, for example, the frame according to claim 1), assigns the identifier to the already-encrypted frame.

Next, an operation when employing the invention will be described. To start with, the authentication phase will be explained. The key generation function of the VPN gateway generates an encryption VPN session with the client by a method such as a public key encryption method, etc., and generates the keys used by both of the client and the VPN gateway for the encryption and the decryption. The identifier generation function of the VPN gateway generates the session identifier for uniquely identifying the VPN session. The key transfer function of the VPN gateway receives the encryption key and the decryption key from the key generation function, and transmits these keys to the server. The identifier transfer function of the VPN gateway receives the identifier from the identifier generation function and sends the identifier to the server.

Next, the data transmission phase will be explained.

The client encrypts the frame with the encryption key, and transmits the frame together with the session identifier to the VPN gateway. The frame transfer function of the VPN gateway, when receiving the frame, as the session identifier is received from the client, sets a frame transfer destination to the server and thus transfers the receipt frame. The frame receiving function of the server decrypts the frame with the decryption key associated with the session identifier. The frame transmitting function of the server encrypts the frame with the encryption key, and sends the session identifier and the encrypted data to the VPN gateway. The frame transfer function of the VPN gateway, when receiving the frame, as the session identifier is received from the server, sets the frame transfer destination to the client, and transfers the receipt frame.

The client decrypts the receipt frame with the decryption key associated with the session identifier.

As described above, according to the invention, in the authentication phase, the VPN gateway transfers the encryption key and the decryption key to the server. In the data communication phase, the encryption/decryption processes are executed between the server and the client, thereby eliminating the necessity for the encryption/decryption processes of VPN gateway in the data communication phase. This leads to a decrease in the processing load caused by the encryption/decryption processes of VPN gateway.

When the client in the Internet accesses the server in the Intranet, this requires authentication for entering the Intranet and authentication for accessing the server. In this case, the VPN gateway needs to transfer a server authentication frame from the client to the server and to transmit an authentication result given from the server to the client. The following functions are added for reducing the encryption/decryption processes for this authentication frame.

The VPN gateway device mainly has an access permission retaining function of retaining, for every user, the access permission information to the intranet and the access permission information to the server, and an access authentication notifying function of sending a frame for notifying of the access permission or access rejection.

Next, an operation when using the added functions given above will be described. The authentication phase will be explained.

The client sends user authentication data to the VPN gateway. When the VPN gateway receives the authentication data, the access permission retaining function reads pieces of access permission information to the Intranet and to the server. The access authentication notifying function transmits an access permission notifying frame to the client if the access permission information indicates "permitted". Further, if the access permission information indicates "rejected", an access rejection notifying frame is sent to the client.

This scheme makes unnecessary an access request and a response frame thereto between the client and the VPN gateway and between the VPN gateway and the server, and it is therefore possible to reduce, to a greater degree, the encryption/decryption processes of the VPN gateway according to the invention.

This scheme shows that in place of generating the key between the client and the VPN gateway and thereafter transferring this key to the server, the client may transfer a key generation frame to be transmitted to the server, and the server may transfer the key generation frame to be transmitted to the client.

In this case, the VPN gateway device has a key transparent transfer function of transferring the key transfer frame. The server has a key generation function of generating the encryption key and the decryption key with respect to the client.

Next, an operation when employing the added functions described above will be explained.

The authentication phase will be described.

The client generates (establishes) the encryption VPN session with the VPN gateway, and sends the common key to the VPN gateway. The VPN gateway generates the encryption VPN session with the server. The key transparent transfer function of the VPN gateway transfers the common key received from the client directly to the server. The server stores the received common key, and the key generation function of the server sends a different common key to the VPN gateway. The VPN gateway transfers the common key received from the server directly to the client.

Also in the encryption communication system according to claim 2, when the plurality of clients access the specified server many times, the encryption VPN session is required to be generated based on the public key encryption method between the VPN gateway and the server each time the client has the access. For avoiding this load, the encryption VPN session using the common key is previously generated between the server and the VPN gateway, and is hereafter utilized for transferring the common key from the client.

In this case, the VPN gateway device has a pre-session generation function of generating the encryption VPN session with the server beforehand, and an already-generated session retaining module for retaining an identifier of the encryption VPN session generated with respect to each server.

Next, an operation when using the added functions described above will be explained.

A pre-operation (such as after completion of the setting by the server, and so on) will be described. The pre-session generation function of the VPN gateway generates the encryption VPN session with the server, and records the session identifier and the encryption key in the already-generated session retaining module.

Next, the authentication phase will be explained.

The common key is generated between the client and VPN gateway and is transferred to the server. On this occasion, the key transfer function reads the VPN session identifier and the encryption key from the already-generated session retaining module. The key transfer function encrypts the common key with the encryption key for the session associated with the (session) identifier, and sends the common key to the server.

The encryption/decryption processes of the VPN gateway can be reduced by enabling the repetitive use of the session between the VPN gateway and the server in the way described above.

Generally, if the data communications are performed for a long period of time by using the same common key, there arises such a problem in terms of security as to cause a rise in the probability that a content of the communication might be decrypted and so on, and hence a countermeasure such as periodically exchanging the key, etc is needed. In the encryption communication system according to claim 2, each node can distinguish between a pre-exchange key and a post-exchange key and can use different encryption/decryption keys. For attaining this, a session identifier for the post-exchange key is required to be generated afresh. Therefore, according to the invention, the server or the client notifies the VPN gateway of the new session identifier in synchronization with timing when changing the common key. The following functions are added to the invention according to claim 2.

The sever further includes a new common key generation function of generating the new common key and the identifier associated with this common key, a new common key transfer function of encrypting the new common key with the pre-exchange common key and transmitting (the frame) together with the new common key, and a new identifier notifying function of sending the (new) identifier and the old identifier.

The VPN gateway further includes a new identifier registration function of transferring, when receiving the frame containing the identifier, the identifier to the frame transfer function.

Note that the node generating the encryption key and the decryption key may be not the server but the client, and the server and the client may respectively generate unidirectional keys.

Next, an operation when employing the added functions described above will be explained. Herein, a pattern with which the server generates the common key will be described. The data communication phase will be explained.

The new common key generation function in the server generates the new common key and the session identifier. The new common key transfer function in the server encrypts the generated new common key with the old common key, and transmits the encrypted common key together with the new identifier to the client. The new identifier notifying function in the server sends the old identifier and the generated new identifier to the VPN gateway. The new identifier registration function of the VPN gateway transfers the new identifier and the old identifier to the frame transfer function.

If contrived as described above, the client and the server can transmit and receive the frame by using the new common key and the new session identifier.

According to the invention, it is possible to reduce the load of the encryption/decryption processes in the communication relay device (e.g., the VPN gateway) that connects the first network (e.g., the Internet) and the second network (e.g., the Intranet).

DESCRIPTION OF THE DRAWINGS

FIG. 4 is an explanatory diagram of a configuration of the VPN gateway 30 included in the encryption communication system in a second embodiment of the invention;

FIG. 6 is an explanatory diagram of a configuration of the VPN gateway 30 included in the encryption communication system in a third embodiment of the invention;

FIG. 7A and FIG. 7B are explanatory sequence diagrams of an operation of the encryption communication system in the third embodiment of the invention;

FIG. 8 is an explanatory diagram of a configuration of the VPN gateway 30 included in the encryption communication system in a fourth embodiment of the invention;

FIG. 9 is an explanatory diagram of a configuration of the VPN gateway 30 included in the encryption communication system in a fifth embodiment of the invention;

FIG. 13A and FIG. 13B are explanatory diagrams of the prior art related to the invention;

DETAILED DESCRIPTION OF THE INVENTION

Figure 1:
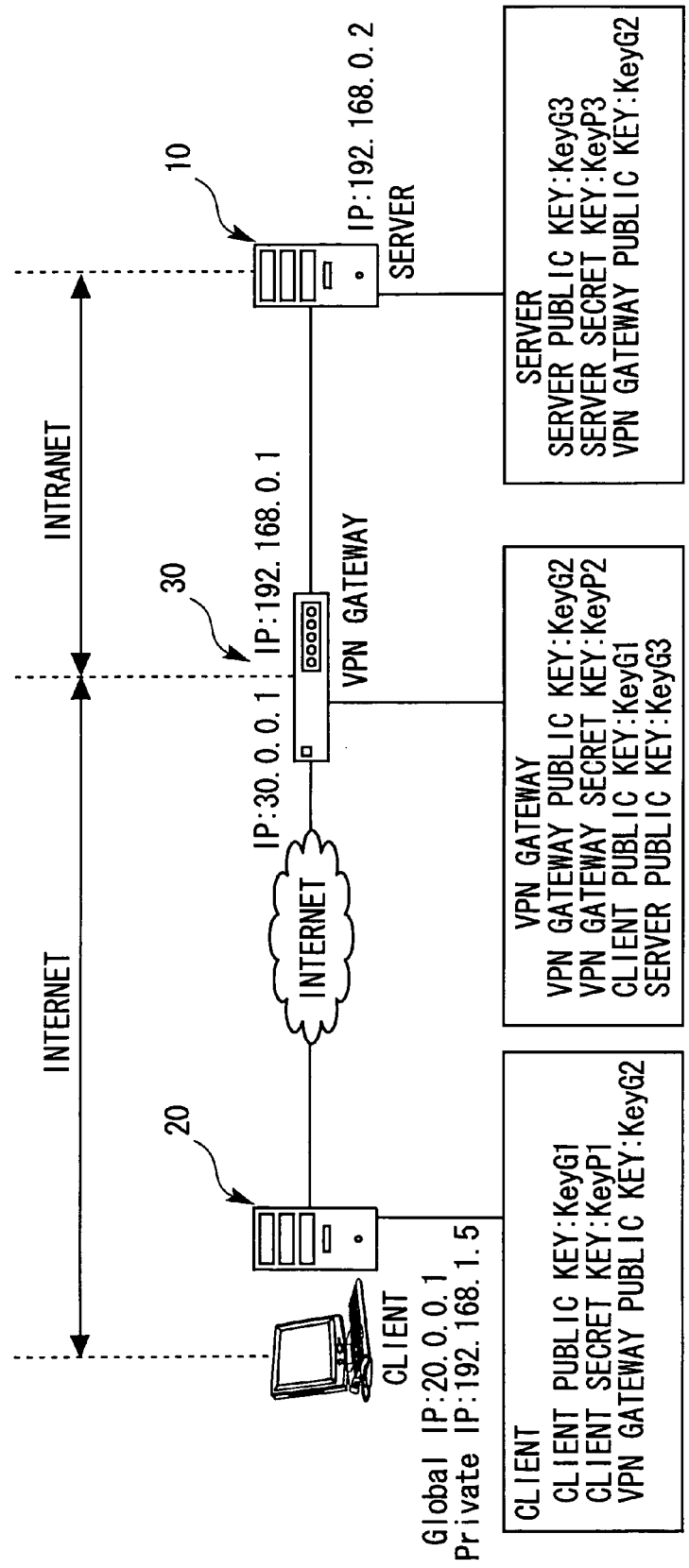
FIG. 1 is an explanatory diagram of an outline of architecture of an encryption communication system by way of a first embodiment of the invention.

An encryption communication system will hereinafter be described with reference to the drawings by way of a first embodiment of the invention. FIG. 1 is an explanatory view of an outline of architecture of the encryption communication system as the first embodiment.

The encryption communication system in the first embodiment includes a VPN (Virtual Private Network) gateway device 30 that connects an Intranet (corresponding to a second network according to the invention) and the Internet (corresponding to a first network according to the invention) to each other (i.e., the VPN gateway device 30 is provided at a connecting point between the Internet and the Intranet). The encryption communication system is configured so that a server 10 in the Intranet performs communications (encryption communications) with a client 20 in the Internet via the VPN gateway device 30.

Set in each of the devices 10, 20 and 30 are an IP address, a public key and a secret key. This setting serves for performing the communications (the encryption communications) between the client 20 and the VPN gateway device 30, the communications (the encryption communications) between the VPN gateway device 30 and the server 10, and the communications (the encryption communications) between the client 20 and the server 10.

Concretely, as shown in FIG. 1, IP addresses are set. To be specific, the client 20 has (is assigned) an IP address "20.0.0.1" on the Internet and an IP address "192.168.1.5" on the Intranet. The VPN gateway 30 is assigned an IP address "30.0.0.1" at an interface on the side of the Internet and an IP address "192.168.0.1" at an interface on the side of the Intranet. The server 10 is assigned an IP address "192.168.0.2" on the Intranet.

Similarly, as shown in FIG. 1, the public keys and the secret keys are set. Specifically, the client 20 has three pieces of keys (a client public key: KeyG1, a client secret key: KeyP1, a VPN gateway public key: KeyG2). The VPN gateway 30 has four pieces of keys (a VPN gateway public key: KeyG2, a VPN gateway secret key: KeyP2, a client public key: KeyG1, a server1 public key: KeyG3). The server 10 has three pieces of keys (a server public key: KeyG3, a server1 secret key: KeyP3, a VPN gateway public key: KeyG2).

If the public keys (the client public key: KeyG1, the VPN gateway public key: KeyG2, the server public key: KeyG3) of each node are opened on the network, as described above, the public keys of the server 10 and the client 20 can be previously transferred to and retained by the VPN gateway 30, while the public keys of the VPN gateway 30 can be previously transferred to and retained by the client 20 and the server 10.

A common key is generated by the device on the side of encrypting in every one-way direction. For example, when the client 20 generates the common key for the communications between the client 20 and the VPN gateway 30, the client 20 employs this common key for encryption, while the VPN gateway 30 uses this common key for decryption. Conversely, when the VPN gateway 30 generates the common key, the VPN gateway 30 employs this common key for encryption, while the client 20 uses this common key for decryption.

In the first embodiment, the same session identifier is utilized upstream and downstream. Note that different session identifiers may also be used upstream and downstream, respectively. Further, the session identifier is a value determined at random within the device. The value may be overlapped between the devices.

Note that in the case of using, for instance, IPSec (Internet Protocol Security) (which corresponds to a predetermined protocol according to the invention), each of parameters employed in the first embodiment can be rewritten with the following value.

The session identifier (SID) is an identifier for uniquely identifying a session. The session identifier can involve using a value in an SPI (Security Parameter Index) field in an AH (Authentication Header) and in an ESP (Encapsulating Security Payload).

A user identifier (UID) is an identifier unique to the user that is used when accessing the Intranet or the server. This identifier depends on a user authentication protocol used on the session generated based on the IPSec. HMAC-SHA (Hashed Message Authentication Code-Secure Hash Standard) and HMAC-MD5 (hash algorithm) are exemplified as the user authentication protocols. An assumption is that this user identifier is stored in payload (or an ESP authentication header) of a frame.

The keys (public key/secret key) generated when generating (establishing) the session based on the IPSec and the key (common key) generated when performing the data communications can be used as the public key (KeyG), the secret key (KeyP) and the common key (KeyS). The [Key] represents a bit string used for the encryption/decryption in a specified encryption algorithm such as DES (Data Encryption Standard) and so on. These key generation algorithms are the known algorithms, and hence their explanations are omitted.

The following discussion will deal with a case where the communications are conducted between the client 20 and the server 10 via the VPN gateway 30.

(Configuration of VPN Gateway 30)

Figure 2:
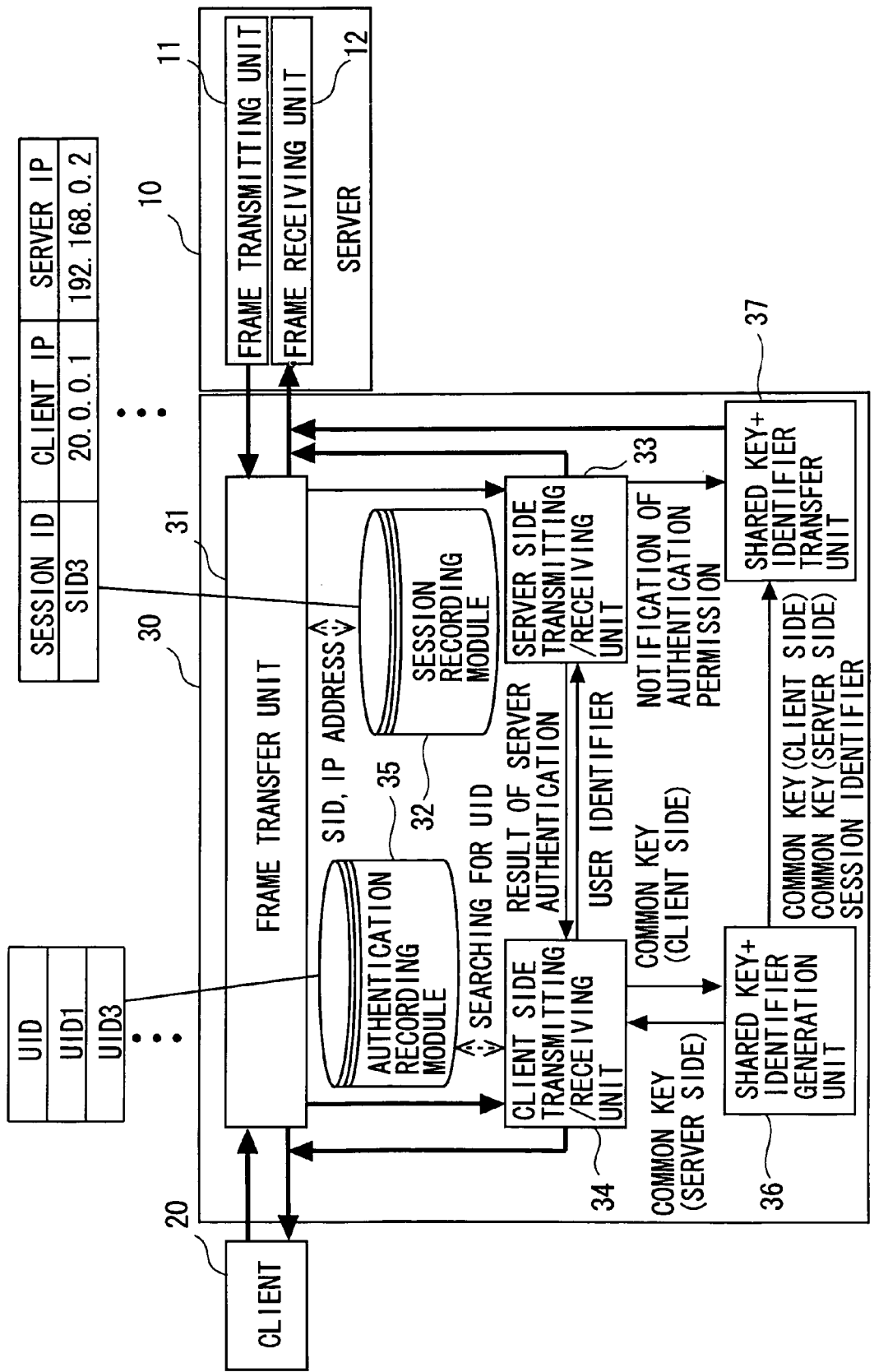
FIG. 2 is an explanatory diagram of a configuration of a VPN gateway 30 included in the encryption communication system in the first embodiment of the invention.

FIG. 2 is an explanatory view of a configuration of the VPN gateway 30.

As shown in FIG. 2, the VPN gateway 30 includes a frame transfer unit 31, a session recording module 32, a server-side transmitting/receiving unit 33, a client-side transmitting/receiving unit 34, an authentication recording module 35, a shared key+identifier generation unit 36, a shared key+identifier transfer unit 37, and so on.

(Frame Transfer Unit 31)

The frame transfer unit 31 is a block for making session authentication of a receipt frame, rewriting the IP addresses, transferring a receipt frame, recording in the session recording module 32, and so forth.

The session authentication of the receipt frame is a process for checking whether the receipt frame (the frame received from the client 20 or the server 10) is an already-authenticated frame or not. To be specific, a VPN session identifier (SID) is read out of the receipt frame, and it is checked whether this session identifier is registered in the session recording module 32 or not.

The rewriting of the IP addresses is a process of rewriting a source IP address and a destination IP address of the receipt frame. If it proves from a result of authenticating the receipt frame that the session identifier is registered, these IP addresses are rewritten.

The transfer of the receipt frame is a process of transferring the receipt frame to a network on the side opposite to the receipt side. If it proves from the result of authenticating the receipt frame that the session identifier is registered, the receipt frame is transferred. Note that if it proves from the result of authenticating the receipt frame that the session identifier is not registered, the receipt frame is transferred to the receiving-side transmitting/receiving unit (the server-side transmitting/receiving unit 33 or the client-side transmitting/receiving unit 34).

The recording in the session recording module 32 is a process of recording, in the session recording module 32, the session identifier (SID) and the IP addresses of the server 10 and of the client 20 that are used in a data communication phase. When receiving the frame indicating completion of the transfer of the common key from the server 10, the session identifier and the IP addresses are recorded in the session recording module 32.

(Client-Side Transmitting/Receiving Unit 34)

The client-side transmitting/receiving unit 34 is a block for establishing the VPN session with the client 20, wherein the decryption, the user authentication and the encryption are carried out.

The decryption is a process of decrypting, when the receipt frame is encrypted with the public key of the self-device, decrypting (a value in the payload) of the receipt frame by use of the secret key of the self-device.

The user authentication is a process of, when the user identifier (UID) for accessing the Intranet is contained in the decrypted frame, searching through the authentication recording module 35 and thus judging whether the user access should be permitted or rejected. Then, in the case of permitting the access, a frame indicating that the access is permitted is sent to the client 20. Note that when the common key generated by the client 20 is contained in the decrypted frame, this common key is transferred to the common key+identifier generation unit 36.

The encryption is a process of, when receiving the common key and the session identifier from the common key+identifier generation unit 36, encrypting the common key and the session identifier with the secret key of the self-device. A frame containing the encrypted common key and the encrypted session identifier is sent to the client 20. Incidentally, if the decrypted frame contains the user identifier (UID) for the server 10, the user identifier is transferred to the server-side transmitting/receiving unit 33. Further, the client-side transmitting/receiving unit 34, when notified of the access permission from the server-side transmitting/receiving unit 33, sends the notification of the permission to the client 20.

(Common Key+Identifier Generation Unit 36)

The common key+identifier generation unit 36 is a block for generating the common key and the session identifier that are used in the data communication phase. When receiving from the client-side transmitting/receiving unit 34 a frame containing the common key generated by the client 20, the common key+identifier generation unit 36 generates a common key and a session identifier afresh. The common key+identifier generation unit 36 transfers the thus-generated common key and session identifier to the client-side transmitting/receiving unit 34. The common key+identifier generation unit 36 transfers the common key generated by the client 20 and the newly-generated common key and session identifier to the common key+identifier transfer unit 37.

(Common Key+Identifier Transfer Unit 37)

The common key+identifier transfer unit 37 is a block for assembling a frame for transmitting the common key and the session identifier. When receiving from the shared key+identifier generation unit 36 the common key generated by the client 20 and the common key and the session identifier that are generated by the self-device, the common key+identifier transfer unit 37 temporarily retains these keys and identifier. Then, upon receiving an authentication permission notification from the server-side transmitting/receiving unit 33, the common key+identifier transfer unit 37 encrypts the two pieces of common keys and the session identifier that have been retained a short while ago with the server public key, and transmits encrypted keys and identifier to the side of the server 10.

(Server-Side Transmitting/Receiving Unit 33)

The server-side transmitting/receiving unit 33 is a block for establishing the VPN session with the server 10. When receiving a server user identifier (UID) from the client-side transmitting/receiving unit 34, the server-side transmitting/receiving unit 33 encrypts the user identifier with the server public key, and transmits the encrypted identifier to the server 10. Upon receiving a frame for notifying of the access permission from the server 10, the server-side transmitting/receiving unit 33 transfers the authentication permission notification to the common key+identifier transfer unit 37. When receiving a frame indicating completion of the transfer of the common key from the frame transfer unit 31, the server-side transmitting/receiving unit 33 transfers a result of the authentication by the server 10 to the client-side transmitting/receiving unit 34.

(Session Recording Module 32)

The session recording module 32 is a block for recording an SID of the session established between the client 20 and the server 10, and is utilized for short cutting the encryption/decryption processes of the frame.

(Authentication Recording Module 35)

The authentication recording module 35 is a block for recording a UID of the client accessible to within the Intranet from the VPN gateway. The authentication recording module 35 is used for access authentication of the client.

(Configuration of Server 10)

As shown in FIG. 2, the server 10 includes the frame transmitting unit 11, the frame receiving unit, and so on.

(Frame Receiving Unit 11)

The frame receiving unit 11 is a block for executing a process for the frame received from the VPN gateway 30. When receiving the frame encrypted with the public key of the self-device, the frame receiving unit 11 decrypts this frame with the secret key of the self-device. When receiving the frame encrypted with the common key, the frame receiving unit 11 decrypts this frame with the common key generated by the client.

(Frame Transmitting Unit 12)

The frame transmitting unit 12 is a block for executing a process for the frame to be transmitted to the VPN gateway. Upon receiving the user identifier, the frame transmitting unit 12 checks whether the user is permitted to access the server, and transmits a result of this check to the VPN gateway. When receiving the common key, the frame transmitting unit 12 sends a common key transfer completion notification to the VPN gateway. In the data communication phase, the frame transmitting unit 12 encrypts the data to be sent to the client with a common key KeyS1 and transmits the encrypted data addressed to the VPN gateway.

Next, an operation of the encryption communication system having the architecture described above will be explained with reference to the drawings.

Figure 3A:
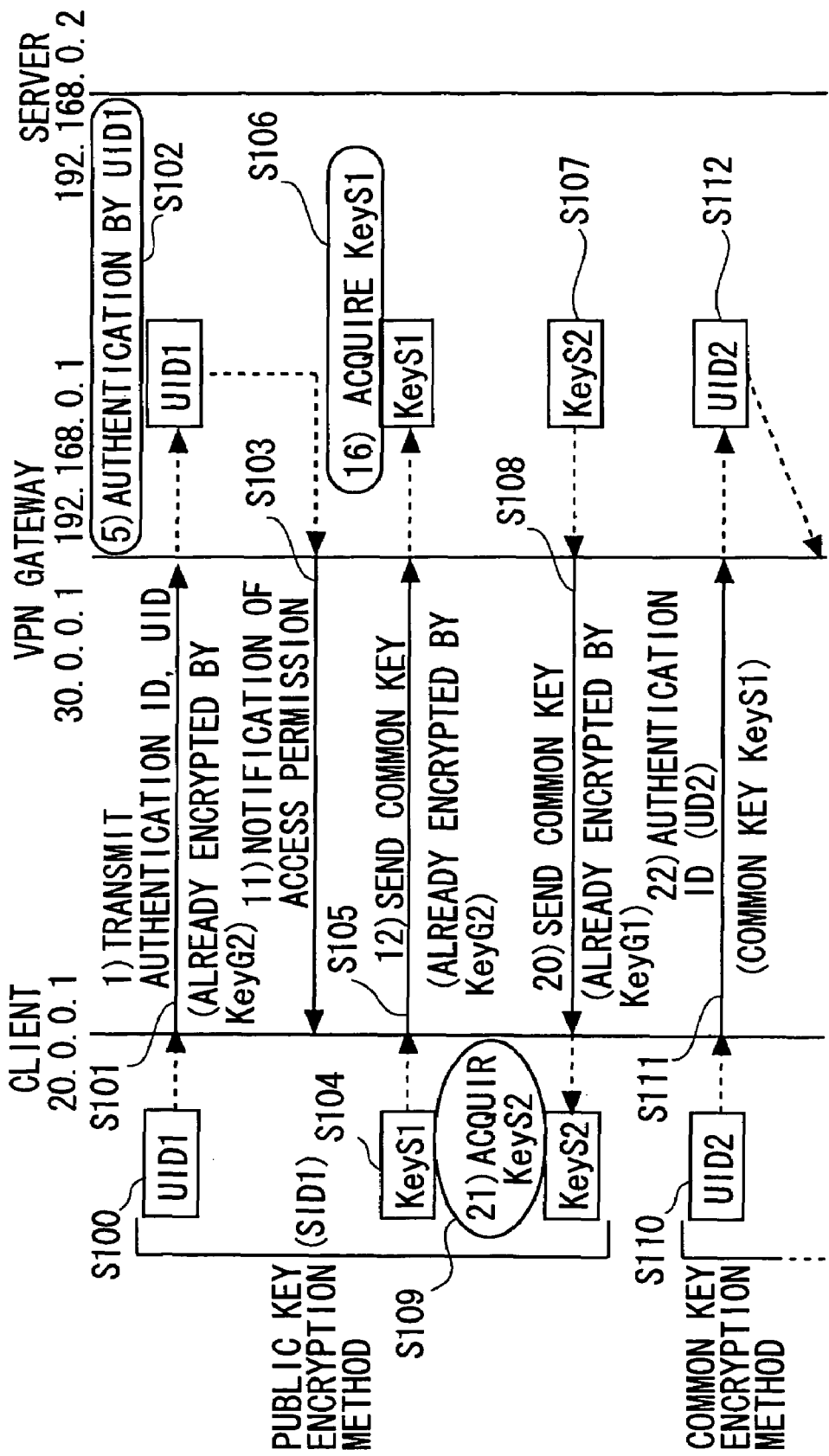
FIG. 3A and FIG. 3B are explanatory sequence diagrams of an operation of the encryption communication system in the first embodiment of the invention.
Figure 3B:
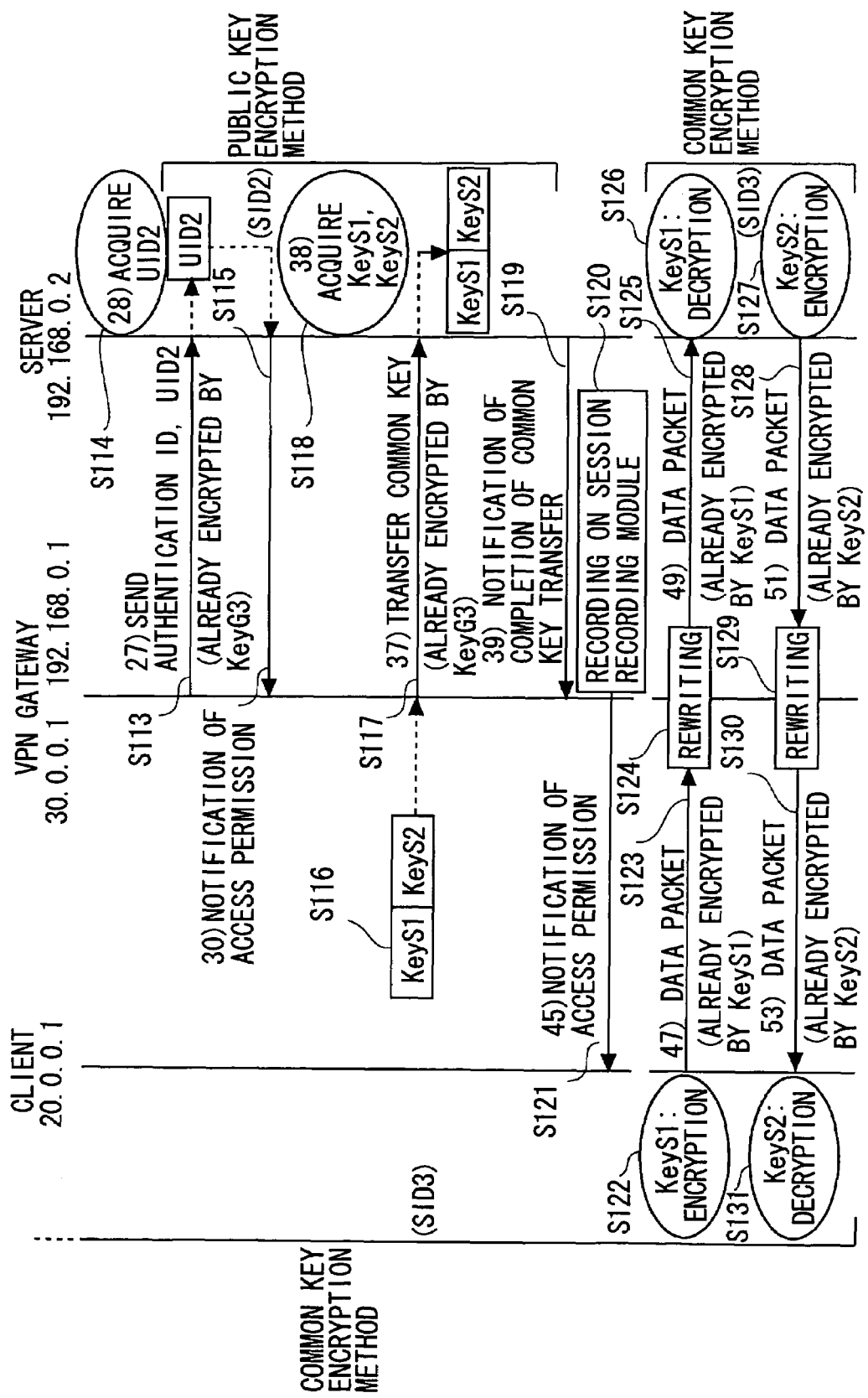

FIG. 3A and FIG. 3B are explanatory sequence diagrams of the operation of the encryption communication system in the first embodiment. Note that the following processes are actualized by predetermined programs being read by the client 20, the VPN gateway 30 and the server 10, respectively.

Authentication Phase of Client⇒VPN Gateway Authentication Phase)

(Intranet Access Authentication by Client)

The following processes for authenticating the access to the Intranet are executed in the client 20 (S100).

A user identifier UID1 is encrypted with a VPN gateway public key KeyG2. A frame (which is also termed an IP packet. The same connotation will hereinafter be applied) containing this encrypted user identifier UIS1 and assigned a session identifier SID1, is assembled. This frame is transmitted as addressed to the VPN gateway 30 (S101). To be specific, a source IP address (an IP address of the client 20) "20.0.0.1" and a destination IP address (an IP address of the VPN gateway 30) "30.0.0.1" are set in this frame, and this frame with the setting of these IP addresses is sent onto the Internet.

In the VPN gateway 30, the following process is executed for authenticating the access of the client 20 to the Intranet (S102).

The frame transfer unit 31, when receiving the frame, reads the session identifier SID1 from this receipt frame. The session recording module 32 is searched through, wherein this session identifier SID1 is used as a (search) key. At this point of time, none of entries concerned exist. Therefore, this receipt frame is transferred directly to the client-side transmitting/receiving unit 34.

The client-side transmitting/receiving unit 34, as this receipt frame is the frame encrypted with the VPN gateway public key KeyG2, decrypts this frame with the secret key KeyP2 of this receipt frame itself. The user identifier UID1 is thereby acquired.

The client-side transmitting/receiving unit 34 checks whether or not the user identifier UID1 is registered in the authentication recording module 35. Herein, it is assumed that an entry is registered with [permitted]. In this case, [permitted] is given as a result of the authentication about the user identifier UID1, and hence the client-side transmitting/receiving unit 34 sends an authentication result notification (access permission notification) as addressed to the client 20 (S103). Namely, the source IP address (the VPN gateway 30) "30.0.0.1" and the destination IP address (the client 20) "20.0.0.1" are set in the frame containing the authentication result, and this frame with the setting of these IP addresses is sent onto the Internet (S102).

The client 20 receives the authentication result notification (the access permission notification) and thereby recognizes that the access authentication to the Intranet is established.

(Exchange of Common Key with Client)

Next, in the client 20, the following process is executed in order to exchange the common key (S104).

The common key KeyS1 is generated. This is a known technology. The common key and the session identifier are encrypted with the VPN gateway public key KeyG2. A frame (which is also termed an IP packet. The same connotation will hereinafter be applied) containing this encrypted common key and session identifier and assigned the session identifier SID1, is assembled. This frame is transmitted as addressed to the VPN gateway 30 (S105).

In the VPN gateway 30, the following process is executed in order to exchange the common key (S106).

The frame transfer unit 31, upon receiving the frame, reads the session identifier SID1 from this receipt frame. The session recording module 32 is searched through, wherein this session identifier SID1 is employed as a key. At this point of time, none of entries concerned exist. Therefore, this receipt frame is transferred directly to the client-side transmitting/receiving unit 34.

The client-side transmitting/receiving unit 34, as this receipt frame is the frame encrypted with the VPN gateway public key KeyG2, decrypts this frame with the secret key KeyP2 of this receipt frame itself. The common key KeyS1 generated by the client 20 is thereby acquired (S106). The client-side transmitting/receiving unit 34 transfers the common key KeyS1 to the shared key+identifier generation unit 36.

The shared key+identifier generation unit 36 newly generates a common key KeyS2 and a session identifier SID3 (S107), and transfers these key and identifier to the client-side transmitting/receiving unit 34. Further, the shared key+identifier generation unit 36 transfers, to the common key+identifier transfer unit 37, the common key KeyS1 received from the client-side transmitting/receiving unit 34 and the newly-generated common key KeyS2 and session identifier SID3. The common key+identifier transfer unit 37 temporarily retains the common key KeyS1, etc.

When receiving the common key KeyS2 and the session identifier SID3 from the shared key+identifier generation unit 36, the client-side transmitting/receiving unit 34 encrypts the common key KeyS2 and the session identifier SID3 by use of the client public key (KeyG1). Then, the client-side transmitting/receiving unit 34 assembles a frame (which is also called an IP packet. The same connotation will hereinafter be applied) containing the encrypted common key KeyS2 and session identifier SID3 and assigned the session identifier SID1 in the authentication phase. The client-side transmitting/receiving unit 34 sends this frame as addressed to the client 20 (S108).

The client 20 receives the frame and decrypts this receipt frame with the secret key (KeyP1) of the frame itself. The common key KeyS2 and the session identifier SID3 are thereby acquired (S109).

Through S100-S109, the exchange of the common key is finished. At a point of time when finishing the exchange of the common key, it follows that the client 20 and the VPN gateway 30 respectively retain the common key KeyS1, the common key KeyS2 and the session identifier SID3.

(VPN Gateway ⇒ Serve Authentication Phase)
(Client Access Authentication to Server)

Next, in the client 20, the following process is executed in order to authenticate an access to the server 10 (S110).

A server authentication user identifier UID2 is encrypted with the common key KeyS1. A frame (which is also termed an IP packet. The same connotation will hereinafter be applied) containing the encrypted user identifier UID2 (and, if an IP address of the transfer destination server 10 is encrypted, this encrypted IP address as well) and assigned a session identifier SID3, is assembled. This frame is transmitted as addressed to the VPN gateway 30 (S111). Incidentally, it is considered that the IP address (192.168.0.2) of the transfer destination server 10 is encrypted and thus contained in this frame. With this scheme, the transfer destination server 10 gets comparatively easily distinguishable without referring to a table which will be explained later on in the VPN gateway 30.

In the VPN gateway 30, the following process is executed for authenticating an access of the client 20 to the server 10 (S112).

The frame transfer unit 31, when receiving the frame, reads the session identifier SID3 from this receipt frame. The session recording module 32 is searched through, with this session identifier SID3 serving as a key. At this point of time, there exist none of entries. Therefore, this receipt frame is transferred directly to the client-side transmitting/receiving unit 34.

When receiving the receipt frame from the frame transfer unit 31, the client-side transmitting/receiving unit 34, this receipt frame being the frame encrypted with the common key KeyS1, therefore decrypts this receipt frame with the common key KeyS1. The server authentication user identifier UID2 is thereby acquired (S109). The client-side transmitting/receiving unit 34 transfers the user identifier UID2 to the server-side transmitting/receiving unit 33.

When receiving the user identifier UID2 from the client-side transmitting/receiving unit 34, the server-side transmitting/receiving unit 33 encrypts this user identifier UID2 with the server public key KeyG3. Then, the server-side transmitting/receiving unit 33 assembles a frame (which is also called an IP packet. The same connotation will hereinafter be applied) containing the encrypted user identifier UID2 and assigned the session identifier SID2. The client-side transmitting/receiving unit 34 transmits this frame as addressed to the server 10 (S113). Specifically, the client-side transmitting/receiving unit 34 sets a destination address (an IP address of the server 10) "192.168.0.2" and a source IP address (an IP address of the VPN gateway 30) "192.168.0.1" in this frame, and transmits the frame with the setting of these IP addresses onto the Intranet defined as the network on the side of the server 10.

Note that the IP address of the server 10 is, it is considered, acquired in the manner that follows. For example, the VPN gateway 30 is made to retain an associated relation (e.g., in a table format) between the IP address (e.g., 20.0.0.1) of the client 20 and the IP address (e.g., 192.168.0.2) of the server 10. Then, the VPN gateway 30, in the case of receiving the frame from the client 20, acquires the IP address of the server by collating the source IP address (the IP address of the client 20) of the receipt frame with the table described previously. Alternatively, if this receipt frame contains the IP address (192.168.0.2) of the server 10 in addition to the user identifier UID2, the IP address (192.168.0.2) of the server 10 is acquired by decrypting the receipt frame as described above.

Next, in the server 10, the following process is executed in order to authenticate an access of the client 20 (S114).

The frame receiving unit 12, when receiving the authentication frame, the receipt frame being the frame encrypted with the public key KeyG3 of this frame itself, therefore decrypts this receipt frame with the secret key KeyP3 of this frame itself. The user identifier UID2 is thereby acquired. Then, the frame transmitting unit 11 checks whether or not the user identifier UID2 is accessible authentication data registered in the server 10. If a result of the authentication proves permitted, the frame transmitting unit 11 assembles a frame (which is termed an IP packet. The same connotation will hereinafter be applied) containing the result of the authentication and assigned the session identifier SID2. The frame transmitting unit 11 sends this frame as addressed to the VPN gateway 30 (S115). To be specific, the frame transmitting unit 11 sets the source IP address (the IP address of the server 10) "192.168.0.2" and the destination IP address (the IP address of the VPN gateway 30) "192.168.0.1" in the frame, and sends this frame with the setting of these IP addresses onto the intranet.

The VPN gateway 30 receives the notification (permission) of the authentication result, thereby recognizing that the access authentication to the server 10 is established.

Next, in the VPN gateway 30, the following process is executed for transferring the common key, etc (S116).

The frame transfer unit 31 thereof, upon receiving the frame containing the authentication result (permission), reads the session identifier SID2 from this receipt frame. The session recording module 32 is searched through, wherein this session identifier SID2 is used as a key. At this point of time, there exist none of entries. Hence, the receipt frame is transferred directly to the server-side transmitting/receiving unit 33.

The server-side transmitting/receiving unit 33, as this receipt frame is the frame containing the permission notification, transfers the notification of the authentication permission to the shared key+identifier transfer unit 37.

The common key+identifier transfer unit 37 encrypts the common key KeyS1, the common key KeyS2 and the session identifier SID3 that are temporarily retained a short while ago by use of the server public key KeyG3. The common key+identifier transfer unit 37 assembles a frame containing the encrypted common key KeyS1, etc and assigned the session identifier SID2. The common key+identifier transfer unit 37 sends this frame as addressed to the server 10 (S117).

In the server 10, the following process is carried out (S118).

The frame receiving unit 12 thereof receives the frame and decrypts this receipt frame with its own secret key KeyP3. The common key KeyS1, the common key KeyS2 and the session identifier SID3 are thereby acquired.

Through S110-S118, the transfer of the common key, etc is terminated. At the point of time when finishing the transfer of the common key and so on, it follows that the server 10 retains the common keyKeyS1, the common keyKeyS2 and the session identifier SID3 in the same way as the client 20 does.

Next, in the server 10, for notifying the VPN gateway 30 of completion of the common key transfer, the frame transmitting unit 11 thereof assembles a frame (which is also termed an IP packet. The same connotation will hereinafter be applied) including the common key transfer completion notification containing the session identifier in the data communication phase and assigned the session identifier SID2. The frame transmitting unit 11 transmits this frame as addressed to the VPN gateway 30 (S119).

The VPN gateway 30 receives the common key transfer completion notification, thereby recognizing that the common key etc has completely been transferred to the server 10.

Next, in the VPN gateway 30, the following process is executed.

The frame transfer unit 31 thereof, upon receiving the common key transfer completion notification, reads the session identifier SID2 from this receipt frame. The session recording module 32 is searched through, wherein this session identifier SID2 is used as a key. At this point of time, there exist none of entries. Hence, the receipt frame is transferred directly to the server-side transmitting/receiving unit 33. Further, the session recording module 32 is recorded with the session identifier SID3 in the data communication phase, the IP address (192.168.0.2) of the server 10 and the IP address (20.0.0.1) of the client 20 (S120).

When receiving the receipt frame from the frame transfer unit 31, the server-side transmitting/receiving unit 33 transfers the result (permission) of the server authentication to the client-side transmitting/receiving unit 34.

The client-side transmitting/receiving unit 34 assembles a frame containing the server authentication result (access permission result) and assigned the session identifier SID1, and transmits this frame as addressed to the client (20.0.0.1) (S121).

The client 20 receives the frame, thereby recognizing that the access authentication to the server 10 is established.

(Data Communication Phase (Client⇒Server))

In the client 20, the following process is executed (S122).

The data to be transmitted to the server 10 is encrypted with the common key KeyS1. Assembled is a frame (which is also referred to as an IP packet. The same connotation will hereinafter be applied) containing the encrypted data and assigned the session identifier SID3. This frame is transmitted as addressed to the VPN gateway 30 (S123).

In the VPN gateway 30, the following process is conducted (S124).

The frame transfer unit 31 thereof, when receiving the frame, reads the session identifier SID3 from this receipt frame. The session recording module 32 is searched through, with this session identifier SID3 used as a key. The session recording module 32 is registered, in the previous S120, with the session identifier SID3 in the data communication phase, the IP address (192.168.0.2) of the server 10 and the IP address (20.0.0.1) of the client 20. Accordingly, herein, the IP address (192.168.0.2) of the server 10, which is associated with the session identifier SID3, is read out.

The frame transfer unit 31 rewrites the source IP address of this receipt frame into a self IP address (the IP address of the VPN gateway 30) "192.168.0.1" and the destination IP address of the receipt frame into the IP address "192.168.0.2" of the server 10 that has been read out a short while ago (S124), and sends the frame with these IP addresses rewritten onto the Intranet (S125).

In the server 10, the following process is executed (S126).

The frame receiving unit 12 thereof receives the frame and executes a process of decrypting the receipt frame by use of the decryption common key KeyS1 associated with the session identifier SID3 of this receipt frame.

(Data Communication Phase (Server⇒Client))

In the server 10, the following process is carried out (S127).

The frame transmitting unit 11 thereof encrypts the data to be transmitted to the client 20 with the common key KeyS2. Assembled is a frame (which is also called an IP packet. The same connotation will hereinafter be applied) containing this piece of encrypted data and assigned the session identifier SID3. This frame is transmitted as addressed to the VPN gateway 30 (S128).

In the VPN gateway 30, the following process is executed (S129).

The frame transfer unit 31 thereof, when receiving the frame, reads the session identifier SID3 from this receipt frame. The session recording module 32 is searched through, wherein this session identifier SID3 is used as a key. The session recording module 32 is registered, in previous S120, with the session identifier SID3 in the data communication phase, the IP address (192.168.0.2) of the server 10 and the IP address (20.0.0.1) of the client 20. Accordingly, herein, the IP address (20.0.01) of the client 20, which is associated with the session identifier SID3, is read out.

The frame transfer unit 31 rewrites the source IP address of this receipt frame into a self IP address (the IP address of the VPN gateway 30) "30.0.0.1" and the destination IP address of the receipt frame into the IP address "20.0.0.1" of the client 20 that has been read out a short while ago (S129), and sends the frame with these IP addresses rewritten onto the Internet (S130).

In the client 20, the following process is executed (S131).

Upon receiving the frame, there is executed a process of decrypting the receipt frame with the decryption common key KeyS2 associated with the session identifier SID3 of this receipt frame.

Hereafter, a relay of traffic from the client 20 to the server 10 involves repetitive executions of S122 through S126, and a relay of traffic from the server 10 to the client 20 involves repetitive executions of S127 through S131.

As discussed above, according to the encryption communication system in the first embodiment, in the authentication phase, the VPN gateway 30 transfers the encryption key and the decryption key to the server 10 (S117). In the data communication phase, the encryption/decryption processes are carried out between the server 10 and the client 20. This eliminates the necessity of the encryption/decryption processes of the VPN gateway 30 in the data communication phase. Therefore, it is possible to reduce a processing load on the VPN gateway 30.

Especially in the case of transferring the data having a large data size, the number of frames (frame count) in the data communication phase becomes several times as large as the number of frames in the authentication phase, and hence there is gained more of the effect of reducing the processing load on the VPN gateway, which is obtained by decreasing the encryption processes.

Further, according to the encryption communication system in the first embodiment, the session identifier for uniquely identifying the encryption VPN session is introduced. With this scheme, the VPN gateway 30 becomes capable of identifying the encryption VPN session, and therefore, even in such a condition that the IP address of the server 10 can not be referred to directly from the client 20, the encryption data communications (the encryption VPN communications) can be attained.

Second Embodiment

Next, the encryption communication system will be described by way of a second embodiment of the invention with reference to the drawings.

In the first embodiment, when the client 20 within the Internet accesses the server 10 within the Intranet, the VPN gateway 30 transfers the server authentication frame from the client 20 to the server 10 for authenticating the access to the server 10 (S113), and sends the authentication result from the server 10 to the client 20 (S121). In the second embodiment, the access authentication to the server 10 is also conducted in the VPN gateway 30 in terms of reducing the encryption/decryption processes for the authentication frame in the VPN gateway 30.

FIG. 4 is an explanatory diagram of an outline of architecture of the encryption communication system in the second embodiment. As shown in FIG. 4, the encryption communication system in the second embodiment further includes, in addition to substantially the same architecture of the encryption communication system in the first embodiment, an access authentication notifying unit 38 and an access permission retaining module 39. Other configurations are the same as those explained in the first embodiment, and hence the same numerals are employed with omission of the explanations thereof.

The access authentication notifying unit 38 searches through the access permission retaining module 39 by using the user identifier (UID) of the receipt frame, and judges whether user's accesses to the Intranet and to the server are permitted or rejected. When each access is permitted, a frame indicating that the access is permitted is sent to the client.

The permission retaining module 39 is a block for recording the UID of the client accessible to the server within the Intranet from the VPN gateway, and is utilized for authenticating the client access.

Note that the client-side transmitting/receiving unit 34, in addition to the function explained in the first embodiment, transfers, when the decrypted frame contains the user identifier (UID) for accessing the Intranet, this user identifier (UID) and the IP address of the server to the access authentication notifying unit 38.

Next, an operation of the encryption communication system having the architecture described above will be explained with reference to the drawings.

Figure 5A:
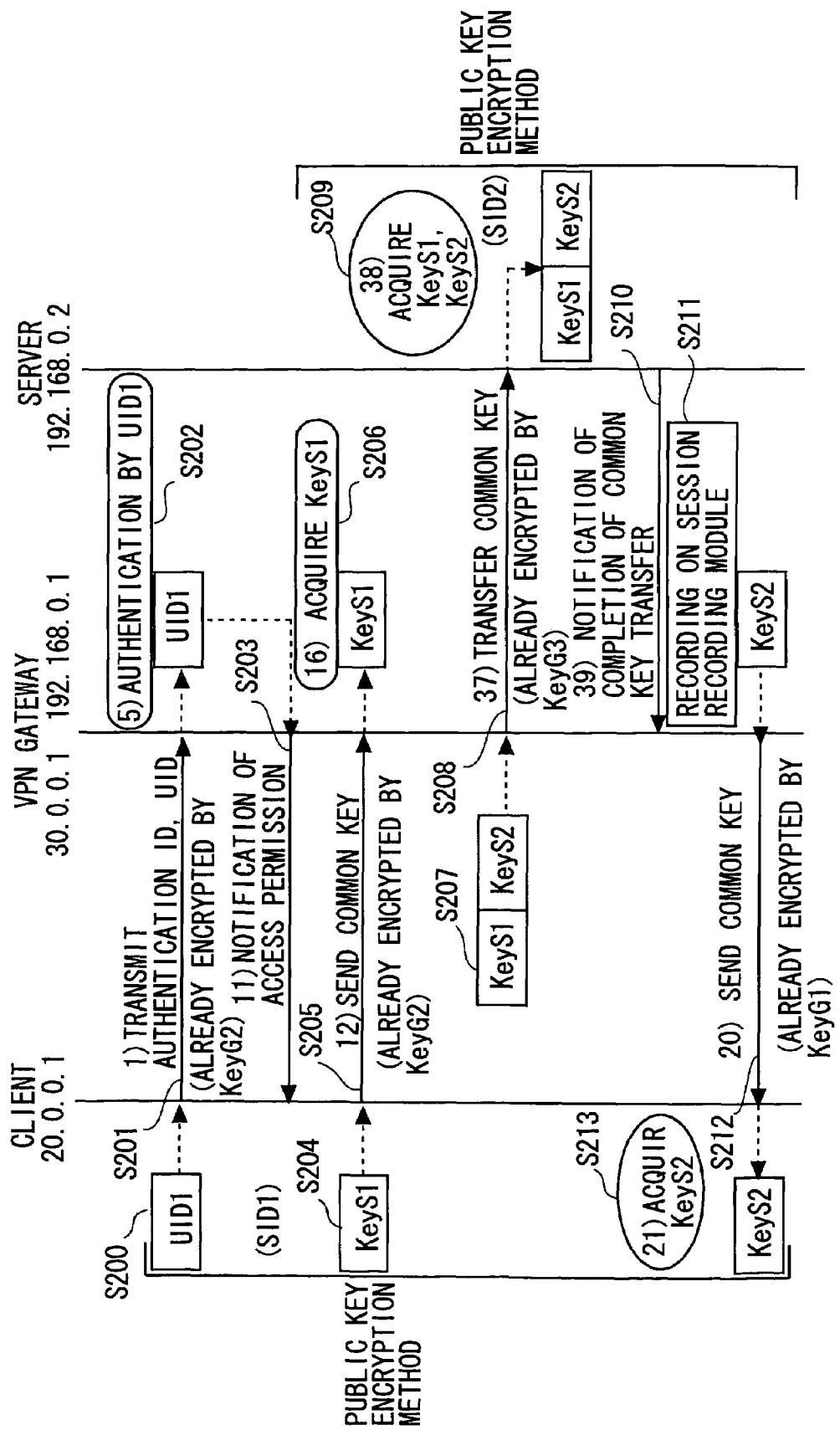
FIG. 5A and FIG. 5B are explanatory sequence diagrams of an operation of the encryption communication system in the second embodiment of the invention.
Figure 5B:
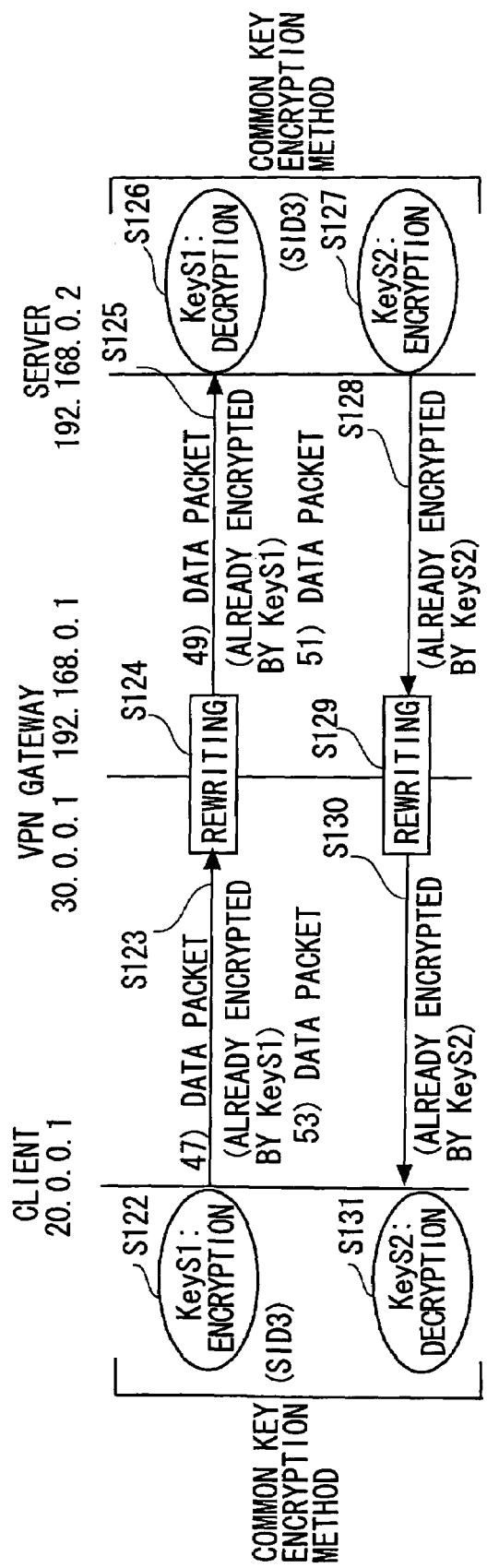
Figure 10:
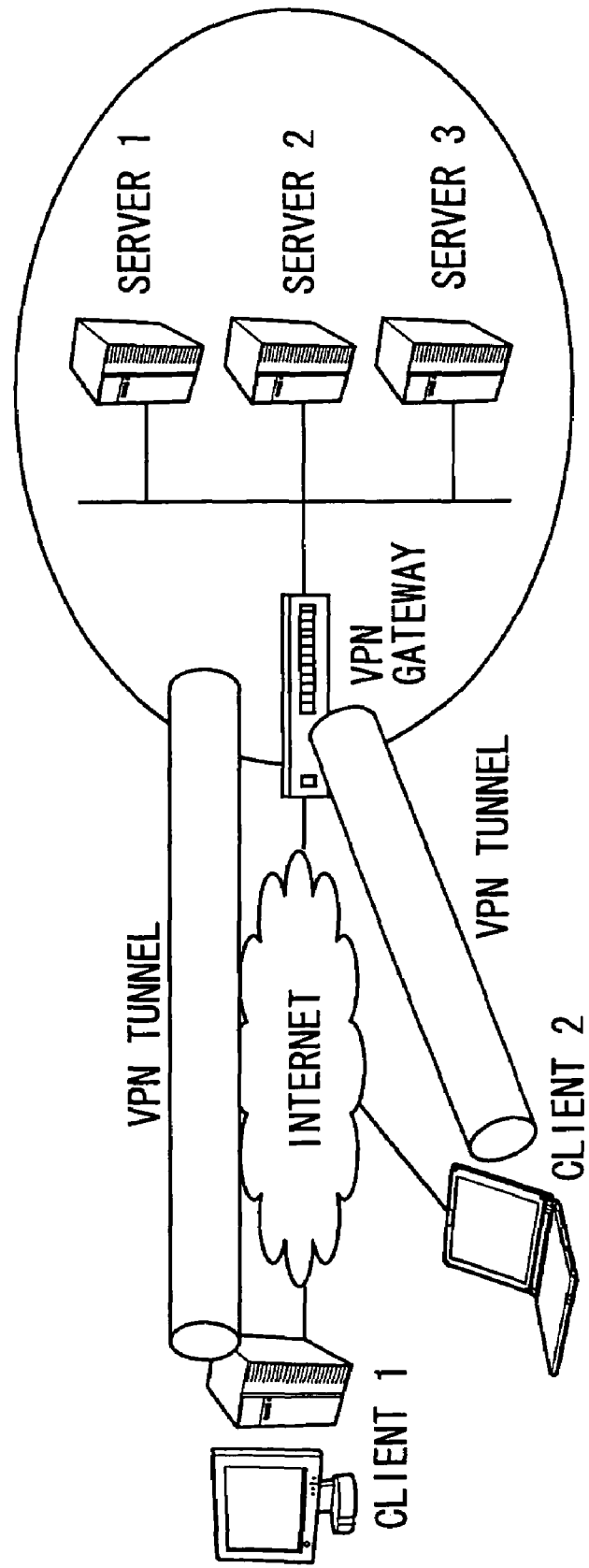
FIG. 10 is an explanatory diagram of a background art related to the invention.
Figure 11:
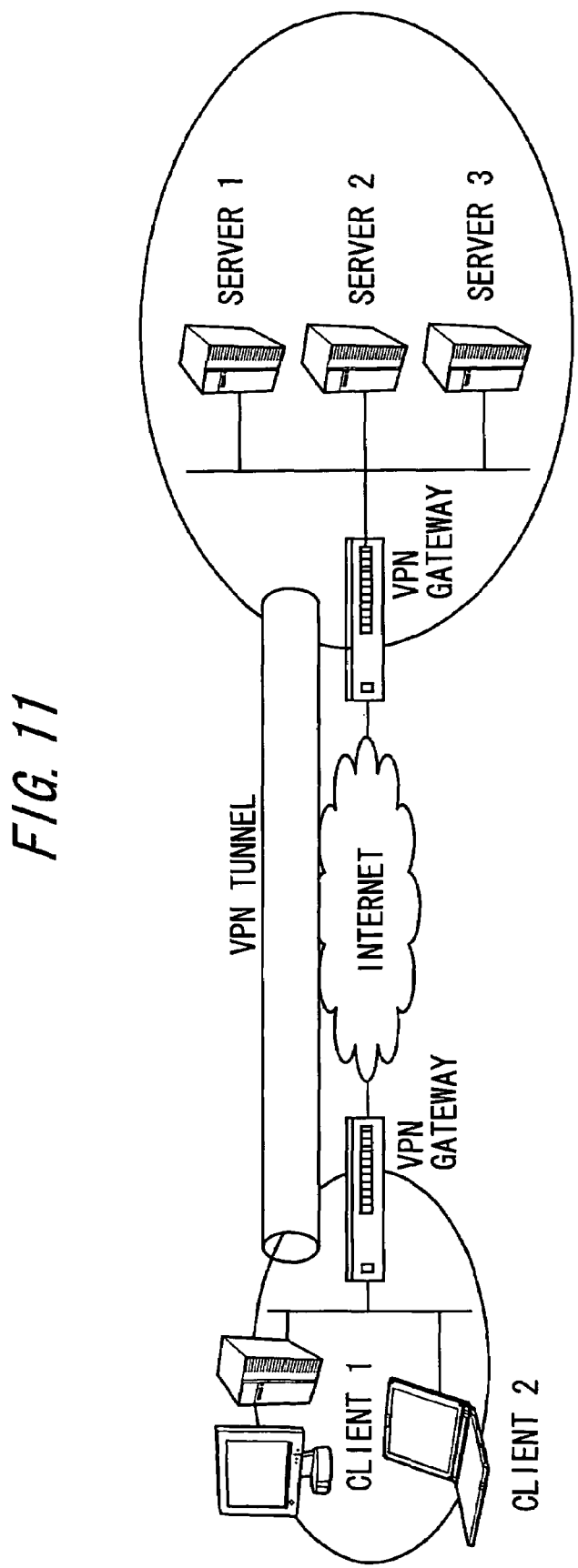
FIG. 11 is an explanatory diagram of the background art related to the invention.
Figure 12A:
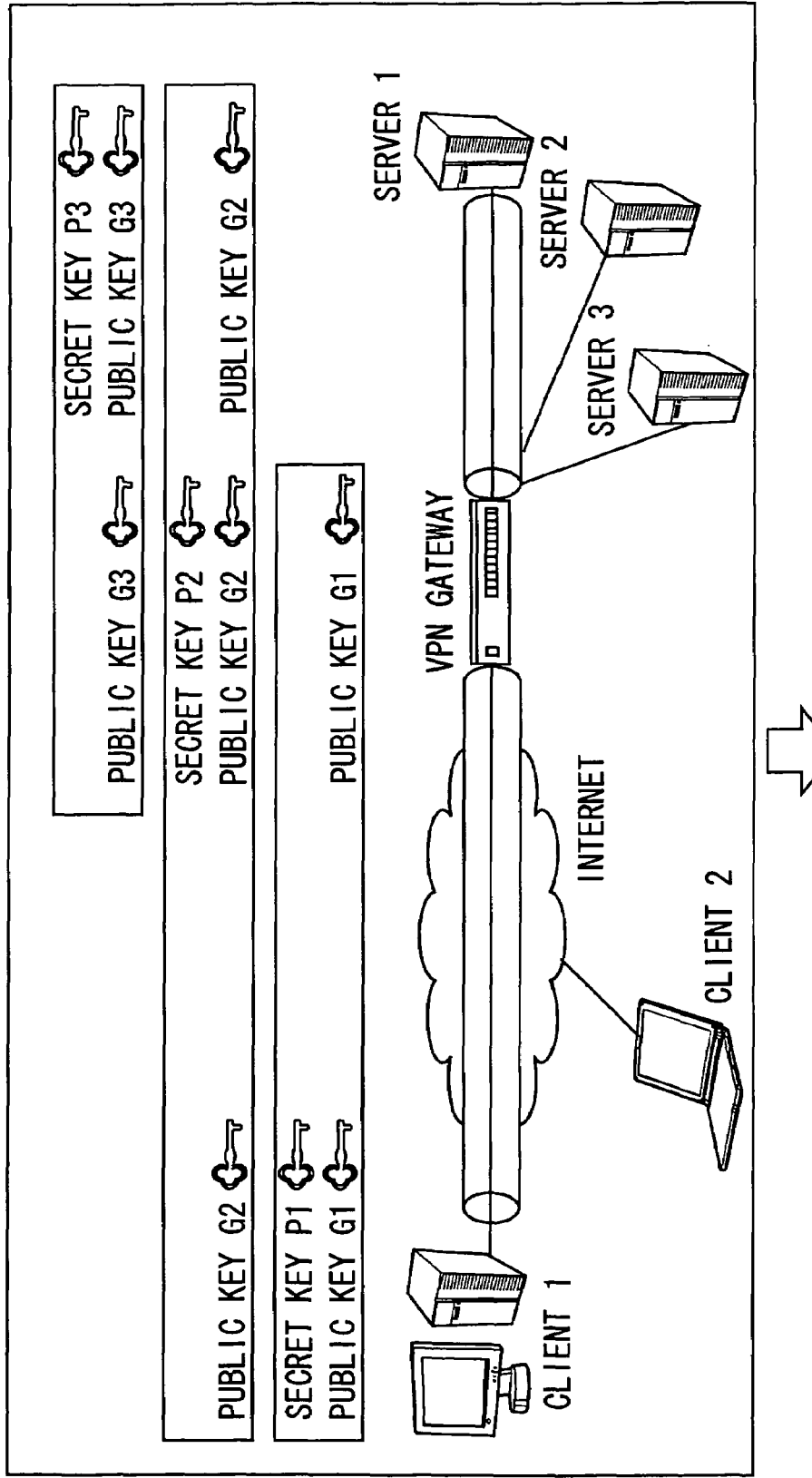
FIG. 12A and FIG. 12B are explanatory diagrams of the prior art related to the invention.
Figure 12B:
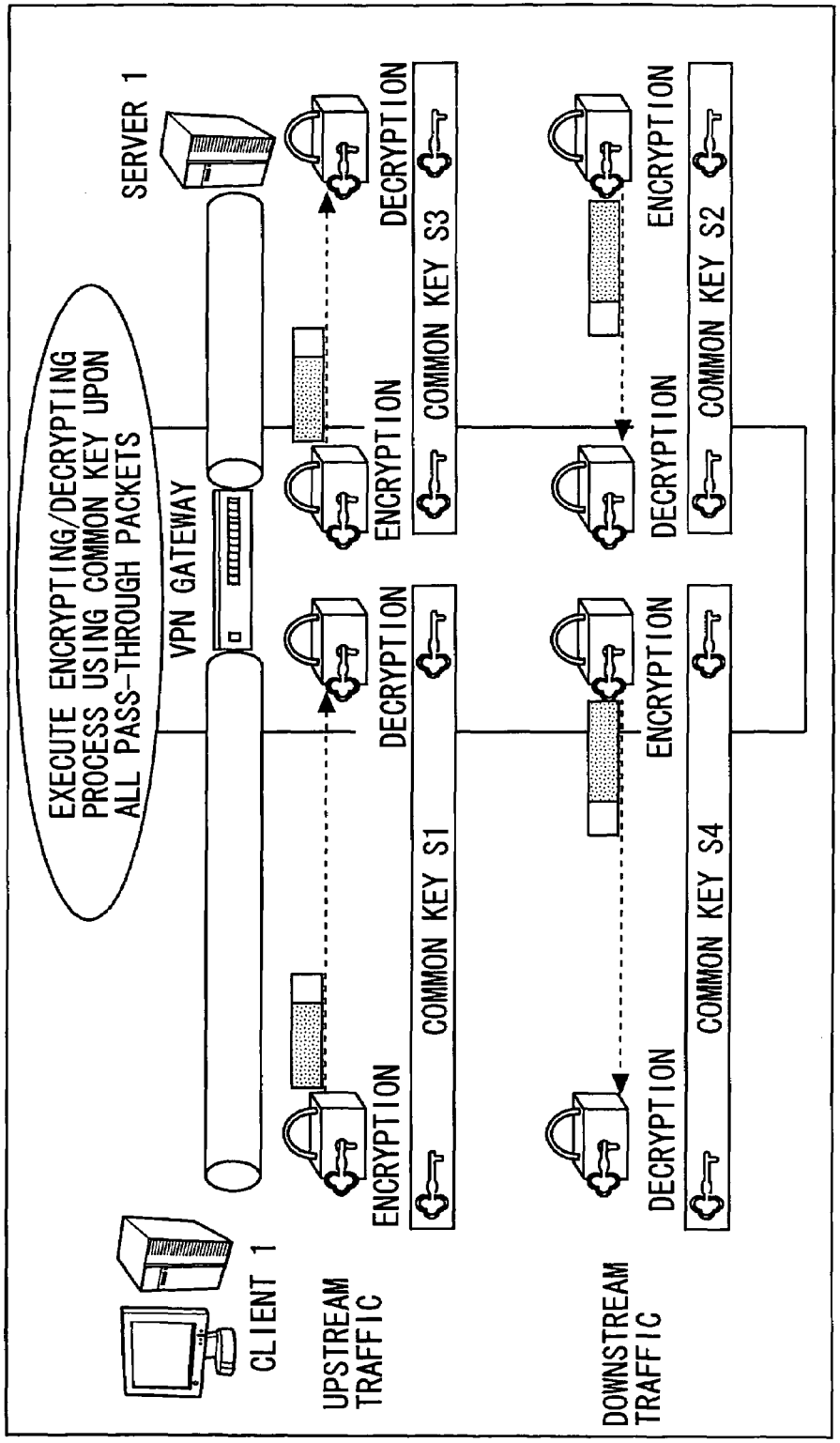
Figure 13A:
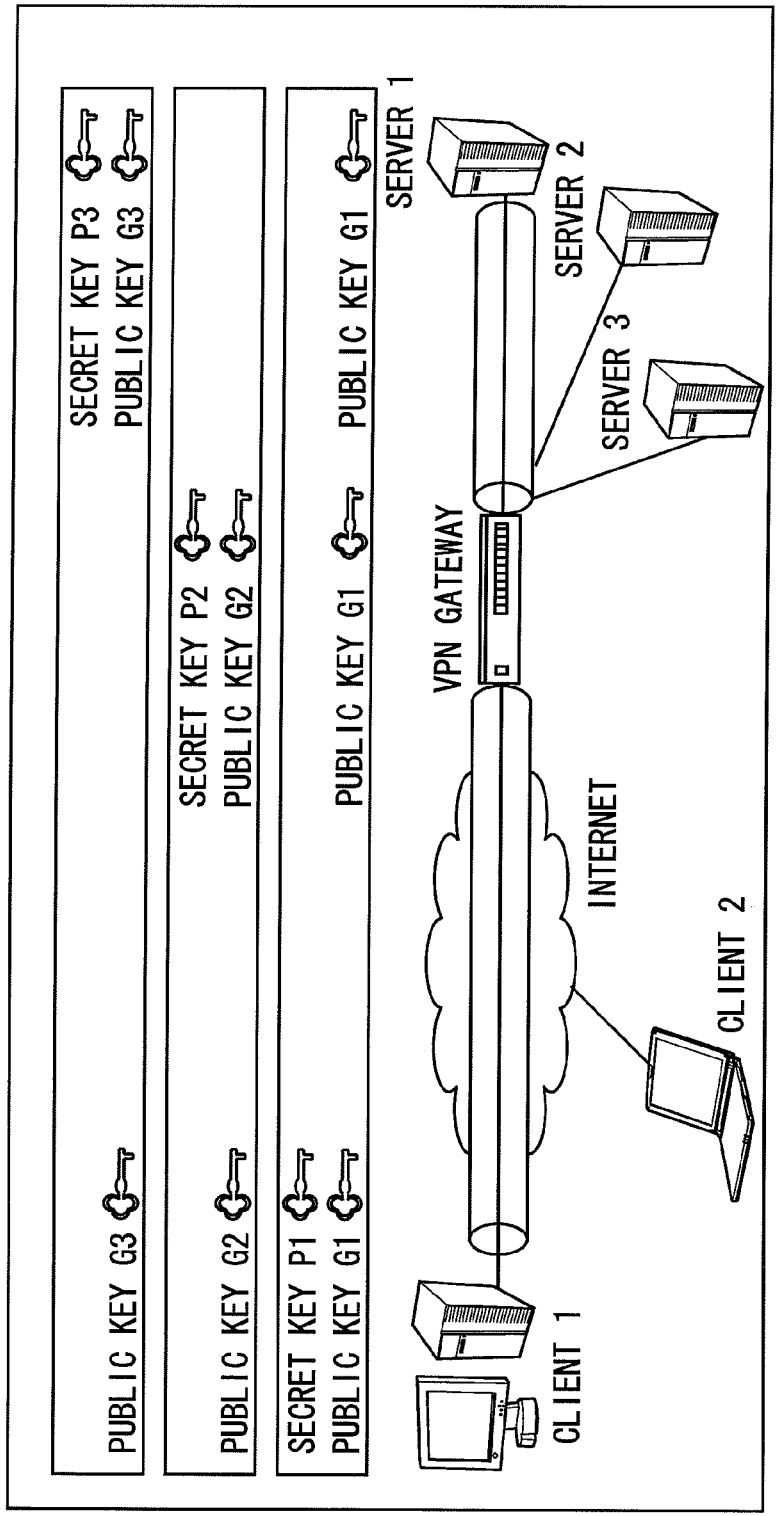
Figure 14A:
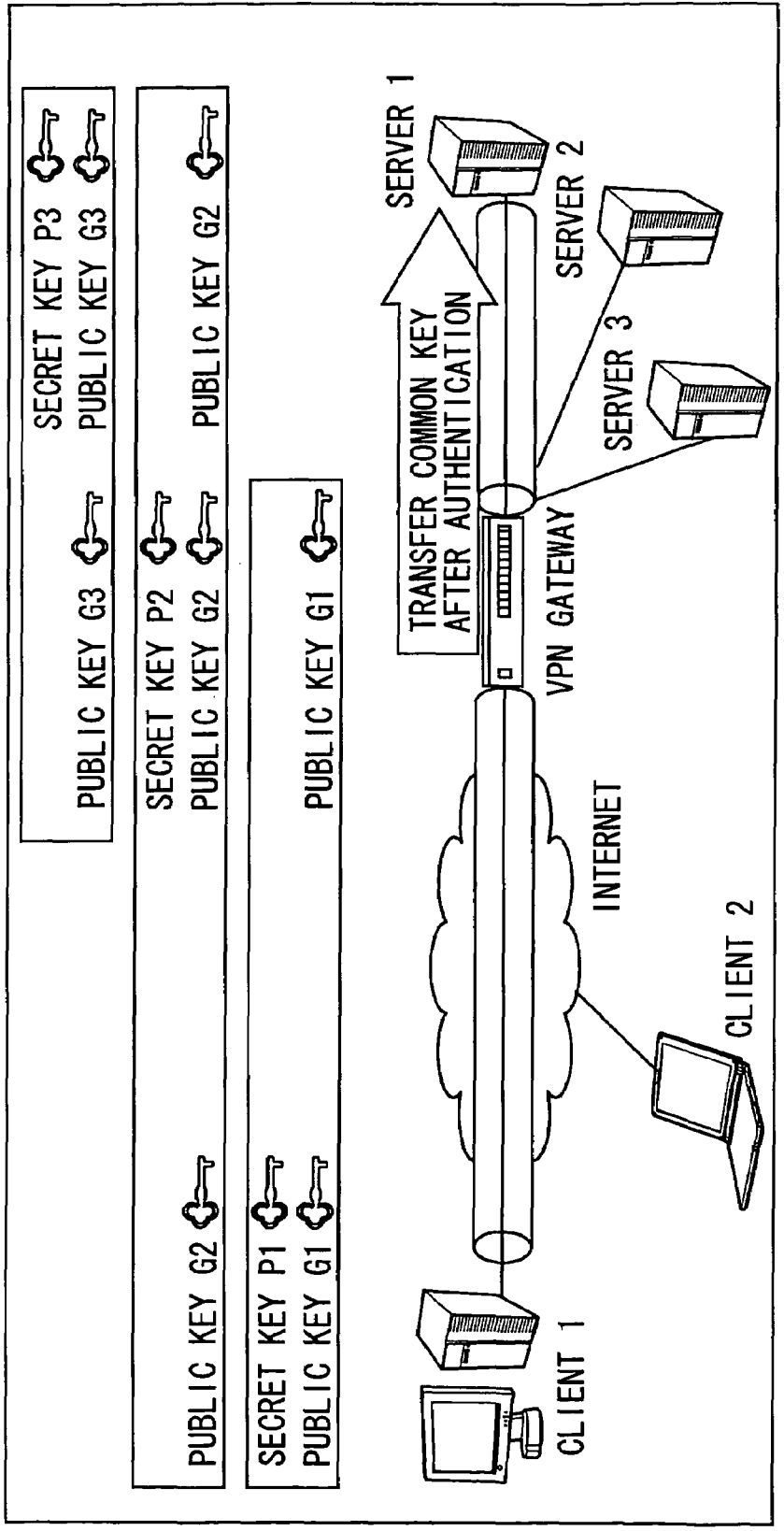
FIG. 14A and FIG. 14B are explanatory diagrams of the principle of the invention.
Figure 14B:
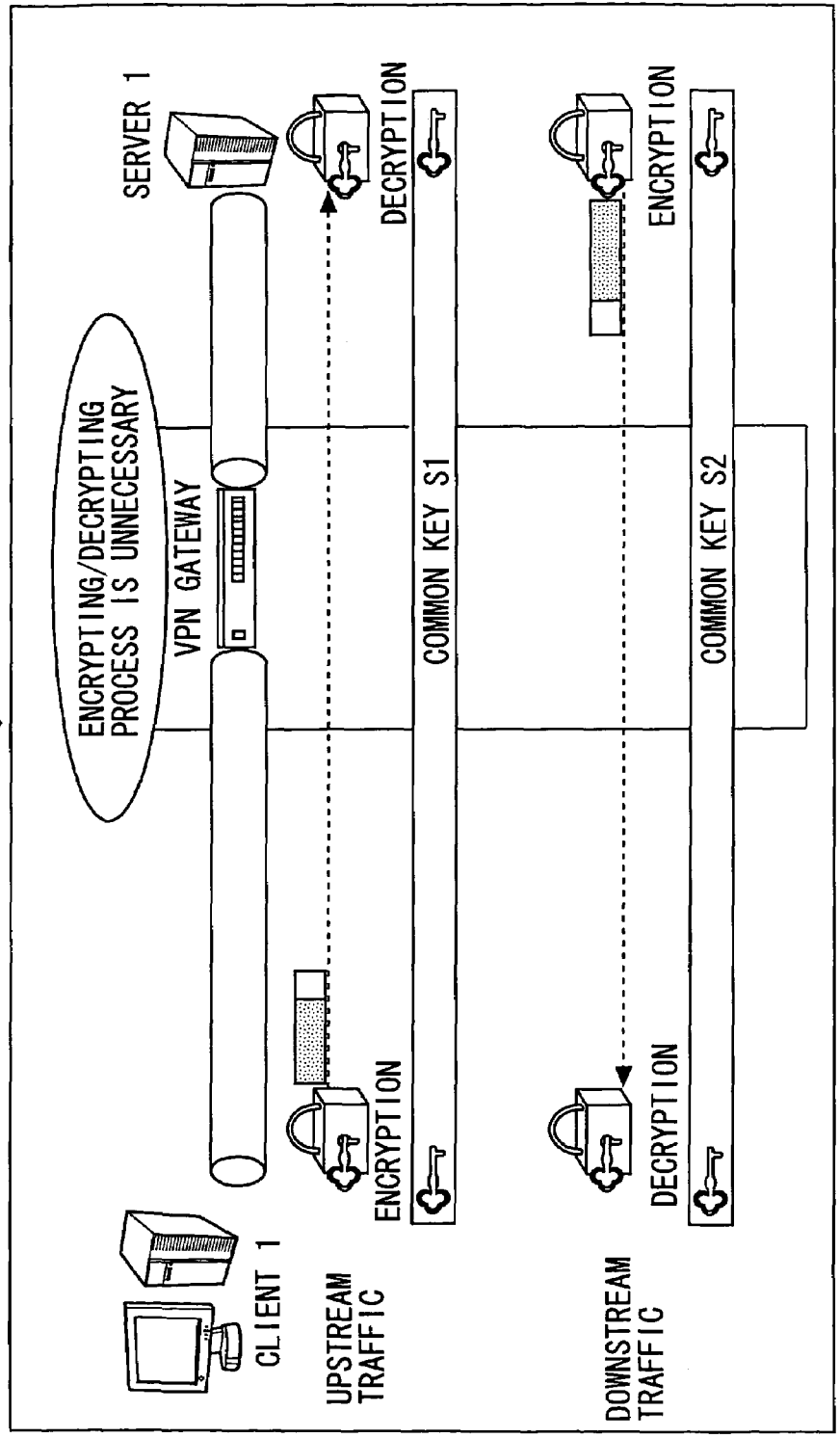
Figure 15:
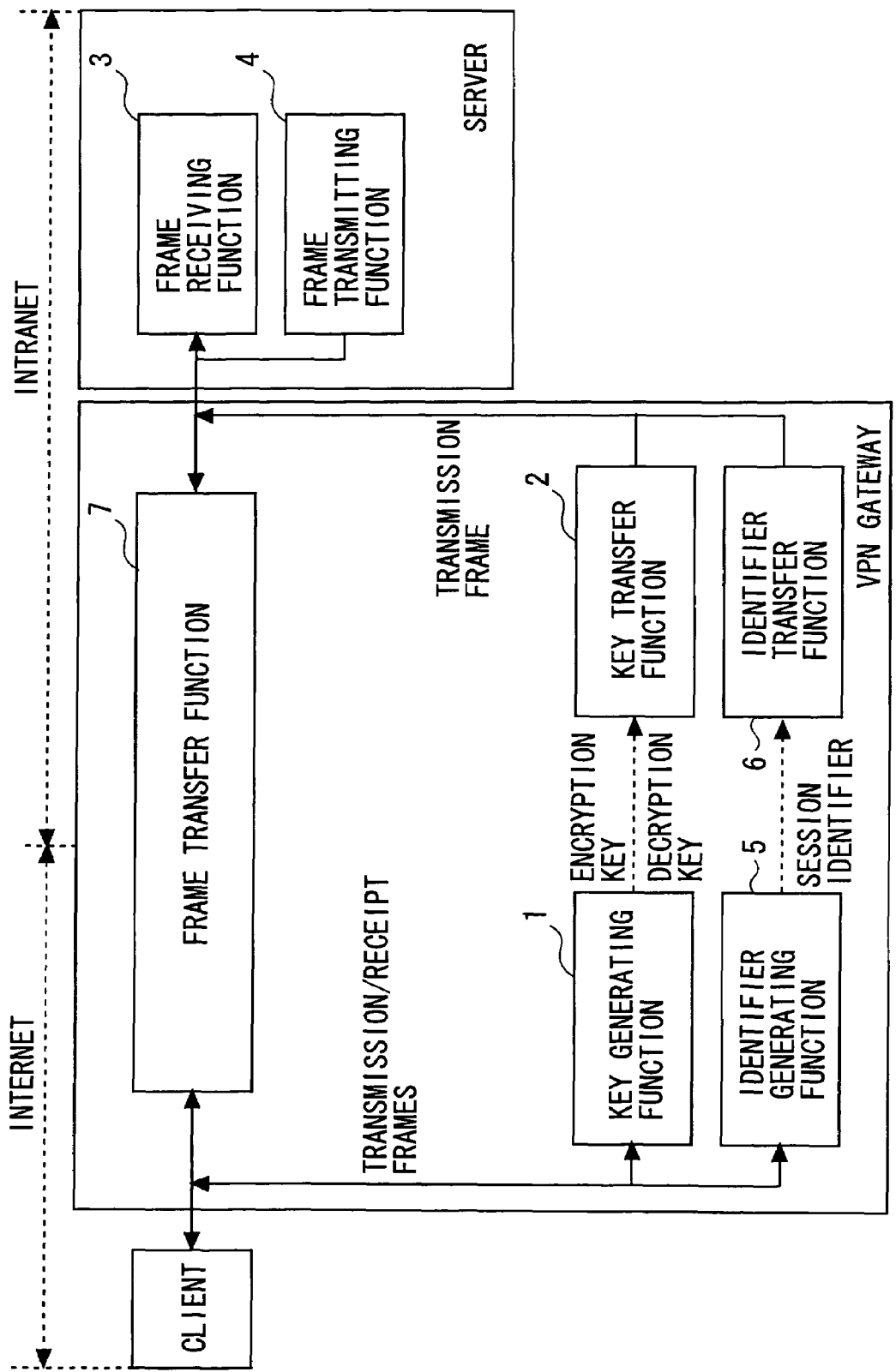
FIG. 15 is an explanatory diagram of the principle of the invention.
Figure 16:
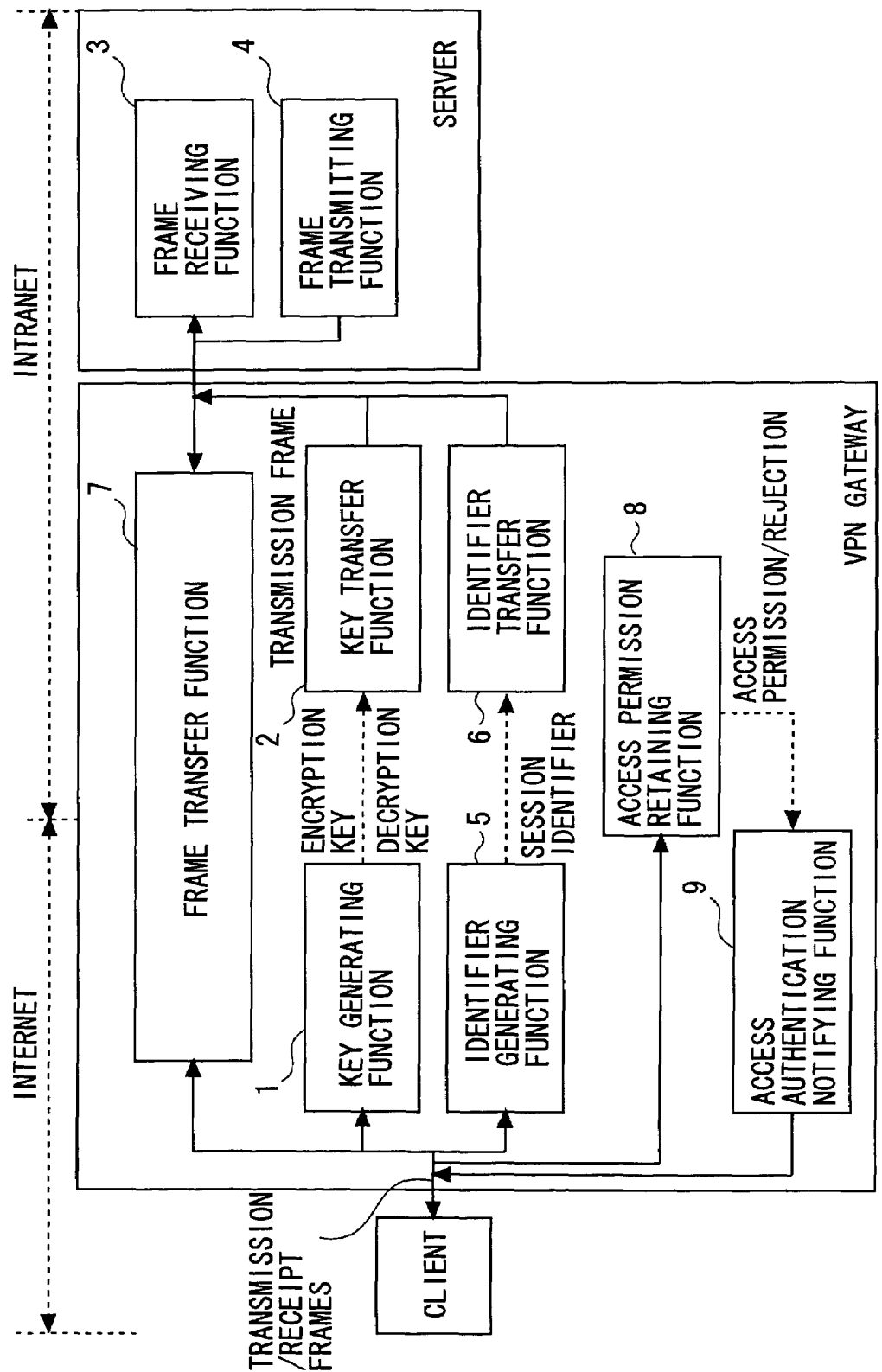
FIG. 16 is an explanatory diagram of the principle of the invention.
Figure 17:
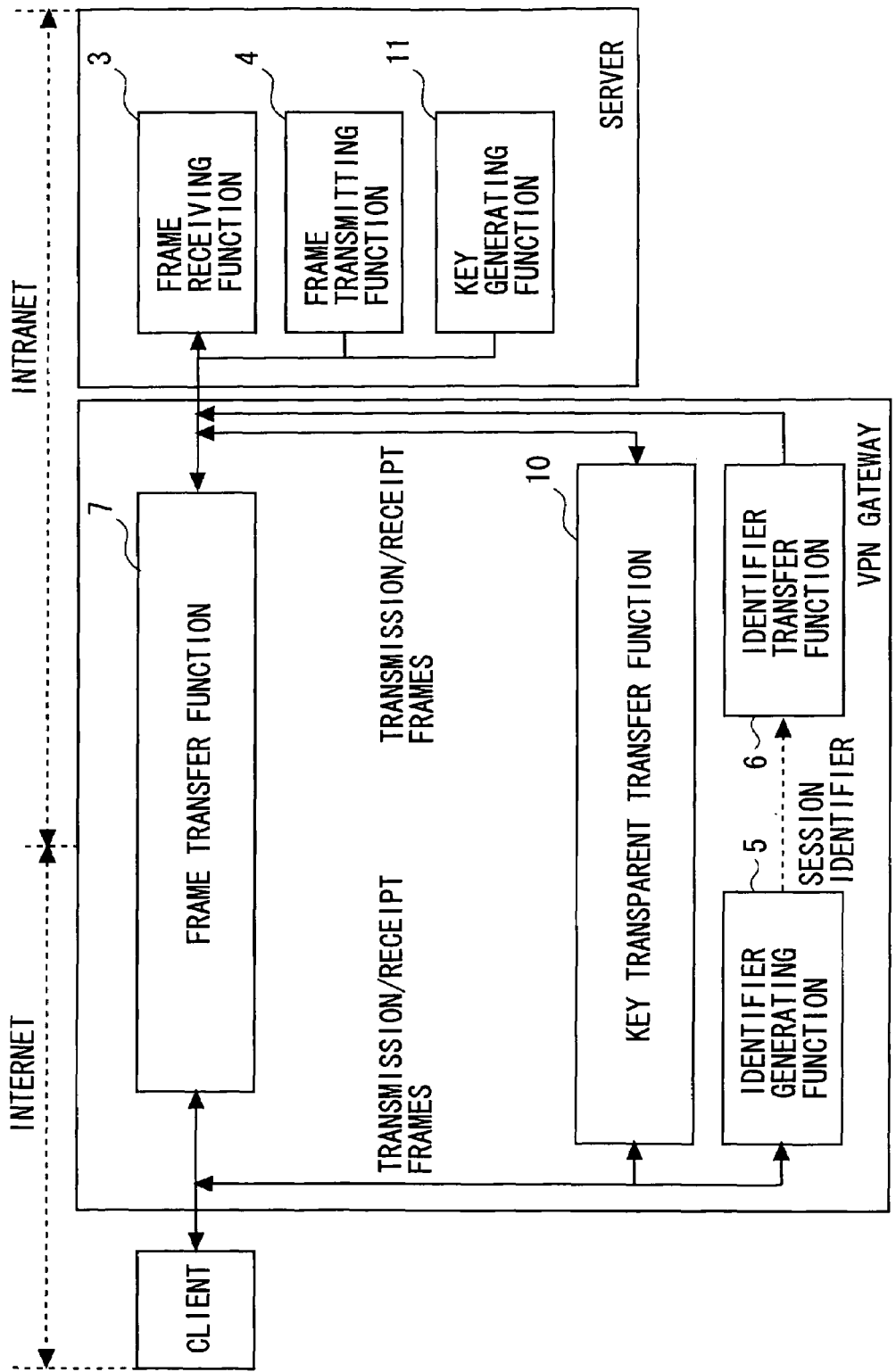
FIG. 17 is an explanatory diagram of the principle of the invention.
Figure 18:
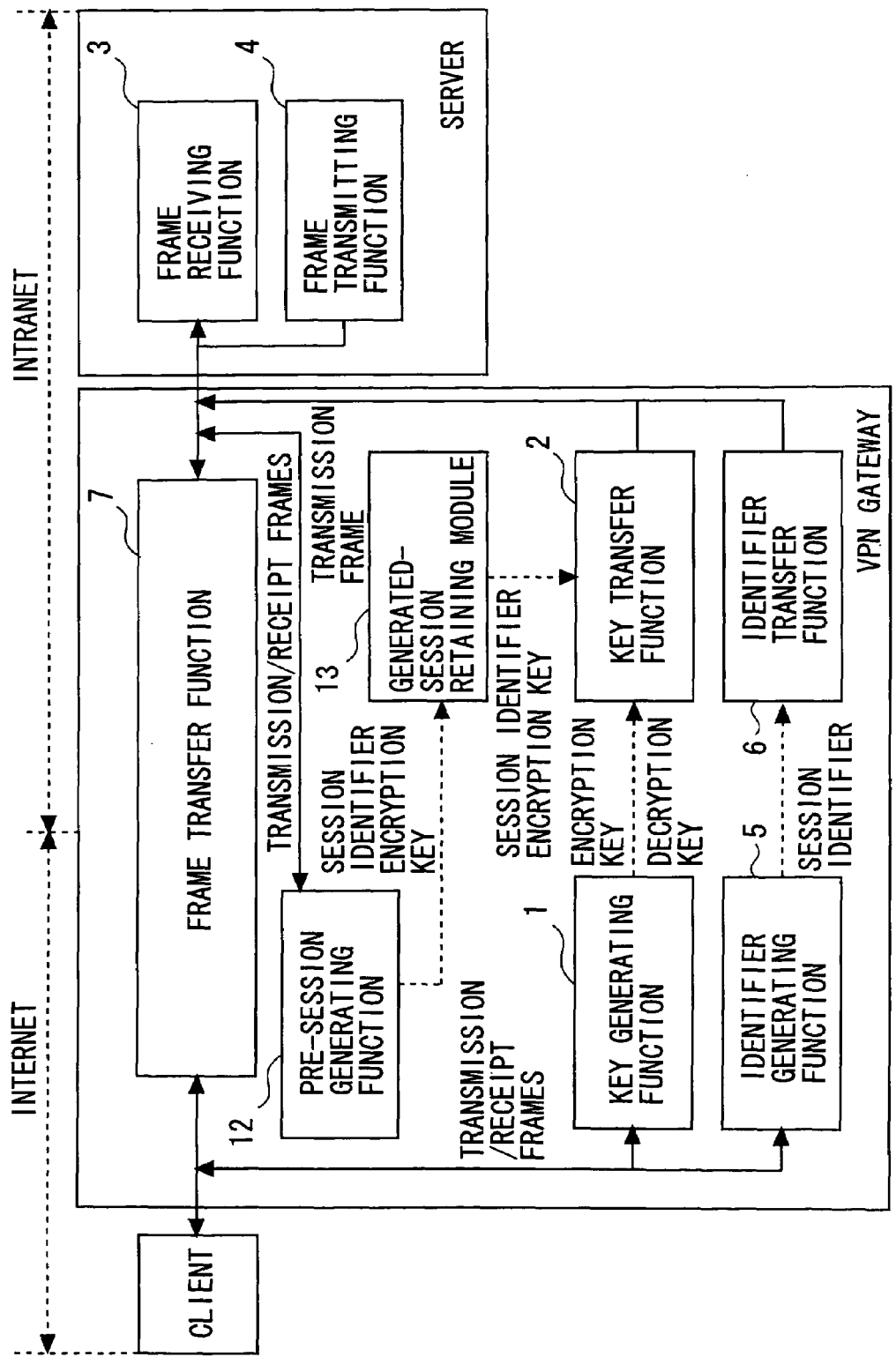
FIG. 18 is an explanatory diagram of the principle of the invention.
Figure 19:
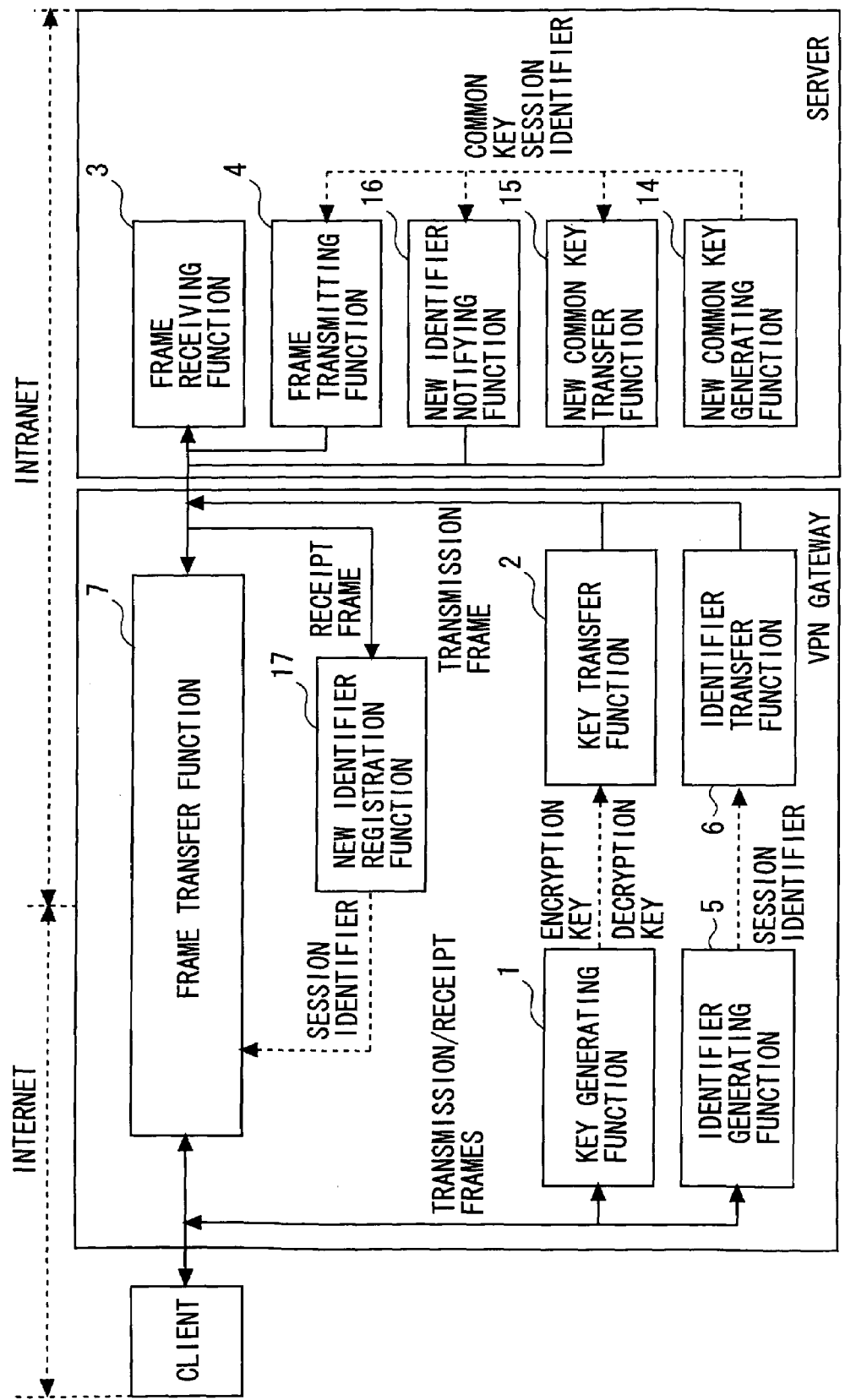
FIG. 19 is an explanatory diagram of the principle of the invention.

FIG. 5A and FIG. 5B are explanatory sequence diagrams of the operation of the encryption communication system in the second embodiment. Note that the following processes are actualized by respective predetermined programs being read by the client 20, the VPN gateway 30 and the server 10.

(Client⇒VPN Gateway Authentication Phase)

(Client Access Authentication to Intranet)

In the client 20, the following process is executed for authenticating the access to the Intranet (S200).

The user identifier UID1 is encrypted with the VPN gateway public key KeyG2. Assembled is a frame (which is also called an IP packet. The same connotation will hereinafter be applied) containing this encrypted user identifier UID1 and assigned the session identifier SID1. This frame is transmitted as addressed to the VPN gateway 30 (S201). To be specific, a source IP address (the IP address of the client 20) "20.0.0.1" and a destination IP address (the IP address of the VPN gateway 30) "30.0.0.1" are set in this frame, and this frame with the setting of these IP addresses is sent onto the Internet.

In the VPN gateway 30, the following process is carried out in order to authenticate the access of the client 20 to the Intranet (S202).

The frame transfer unit 31 thereof, when receiving the frame, reads the session identifier SID1 from this receipt frame. The session recording module 32 is searched through, wherein this session identifier SID1 is used as a key. At this point of time, there exist none of entries. Hence, this receipt frame is transferred directly to the client-side transmitting/receiving unit 34.

The client-side transmitting/receiving unit 34, this receipt frame being the frame encrypted with the VPN gateway public key KeyG2, therefore decrypts the frame with the secret key KeyP2 of this receipt frame itself. The user identifier UID1 is thereby acquired.

The client-side transmitting/receiving unit 34 transfers the user identifier UID1 and the identifier (192.168.0.2) of the server 10 that are contained in the decrypted frame to the access permission notifying unit 38.

The access permission notifying unit 38 searches through the access permission retaining module 39. Herein, the user identifier UID1 and the identifier (192.168.0.2) of the server 10 are registered, and it is assumed that [permitted] is entered. In this case, a result of the authentication about the user identifier UID1, etc is (registered as being) [permitted], and therefore the access permission notifying unit 38 sends an authentication result notification (an access permission notification) as addressed to the client 20 (S203). Namely, the source IP address (the IP address of the VPN gateway 30) "30.0.0.1" and the destination IP address (the client 20)

"20.0.0.1" are set in the frame containing the authentication result, and this frame with the setting of these IP addresses is sent onto the Internet.

The client 20 receives the authentication result notification (the access permission notification), thereby recognizing that the access authentication to the Intranet and the access authentication to the sever 10 are established.

(Exchange of Common Key with Client)

Next, in the client 20, the following process is executed in order to exchange the common key (S204).

The common key KeyS1 is generated. This is the known technology. The common key and the session identifier are encrypted with the VPN gateway public key KeyG2. Assembled is a frame (which is also called an IP packet. The same connotation will hereinafter be applied) containing the encrypted common key and session identifier and assigned the previous session identifier SID1. This frame is transmitted as addressed to the VPN gateway 30 (S205). Specifically, the source IP address (the IP address of the client 20) "20.0.0.1" and the destination IP address (the IP address of the VPN gateway 30) "30.0.0.1" are set in this frame, and this frame with the setting of these IP addresses is sent onto the Internet.

In the VPN gateway 30, the following process is executed in order to exchange the common key (S206).

The frame transfer unit 31 thereof, when receiving the frame, reads the session identifier SID1 from this receipt frame. The session recording module 32 is searched through, wherein this session identifier SID1 is used as a key. At this point of time, there exist none of entries. Hence, this receipt frame is transferred directly to the client-side transmitting/receiving unit 34.

The client-side transmitting/receiving unit 34, this receipt frame being the frame encrypted with the VPN gateway public key KeyG2, therefore decrypts the frame with the secret key KeyP2 of this receipt frame itself. The common key KeyS1 generated by the client 20 is thereby acquired (S206). The client-side transmitting/receiving unit 34 transfers this common key KeyS1 to the shared key+identifier generation unit 36.

The common key+identifier generation unit 36 newly generates a common key KeyS2 and a session identifier SID3 (S207), and transfers these key and identifier to the client-side transmitting/receiving unit 34. Further, the common key+identifier generation unit 36 transfers the common key KeyS1 received from the client-side transmitting/receiving unit 34 and the newly-generated common key KeyS2 and session identifier SID3 to the common key+identifier transfer unit 37.

The common key+identifier transfer unit 37 encrypts the common key KeyS1, the common key KeyS2 and the session identifier SID3 with the server public key KeyG3. The common key+identifier transfer unit 37 assembles a frame containing the encrypted common key KeyS1, etc and assigned the session identifier SID2. This frame is transmitted as addressed to the server 10 (S208). Namely, the source IP address (the IP address of the VPN gateway 30) "192.168.0.1" and the destination IP address (the IP address of the server 10) "192.168.0.2" are set in this frame, and this frame with the setting of these IP addresses is sent onto the Intranet.

In the server 10, the following process is executed (S209).

The frame receiving unit 12 thereof receives the frame and decrypts this receipt frame with its own secret key KeyP3.

Through S200-S209, the transfer of the common key, etc to the server 10 is finished. At a point of time when finishing the transfer of the common key and so on, it follows that the server 10 retains the common key KeyS1, the common key KeyS2 and the session identifier SID3.

Next, in the server 10, for notifying the VPN gateway 30 that the transfer of the common key has been completed, the frame transmitting unit 11 thereof assembles a frame (which is also termed an IP packet. The same connotation will hereinafter be applied) including the common key transfer completion notification containing the session identifier SID3 in the data communication phase and assigned the session identifier SID2. The frame transmitting unit 11 transmits this frame as addressed to the VPN gateway 30 (S210).

The VPN gateway 30 receives the common key transfer completion notification, thereby recognizing that the transfer of the common key, etc has been completed.

Next, the following process is executed in the VPN gateway 30.

The frame transfer unit 31 thereof, when receiving the common key transfer completion notification, reads the session identifier SID2 from this receipt frame. The session recording module 32 is searched through, wherein this session identifier SID2 is employed as a key. At this point of time, there exist none of entries. Hence, this receipt frame is transferred directly to the server-side transmitting/receiving unit 33. Further, the session recording module 32 is recorded with the session identifier SID3 in the data communication phase, the IP address (192.168.0.2) of the server 10 and the IP address (20.0.0.1) of the client 20 (S211).

When receiving the receipt frame from the frame transfer unit 31, the server-side transmitting/receiving unit 33 transfers the common key transfer notification to the client-side transmitting/receiving unit 34.

The client-side transmitting/receiving unit 34 encrypts the common key KeyS2 and the session identifier SID3 by use of the public key (KeyG1) of the self-device. Assembled is a frame containing the encrypted common key KeyS2, etc and assigned the session identifier SID1 in the authentication phase. This frame is transmitted as addressed to the client 20 (S212).

In the client 20, the common key frame is received and decrypted with its own secret key (KeyP1). The common key KeyS2 and the session identifier SID3 are thereby acquired (S213).

Through S210-S213, the exchange of the common key, etc with the client 20 is finished. At a point of time when finishing the exchange of the common key, etc, it follows that the client 20 retains the common key KeyS1, the common key KeyS2 and the session identifier SID3 in the same way as the server 10 does.

Hereinafter, as in the first embodiment, the data communications are performed between the client 20 and the server 10 via the VPN gateway 30 (S122 through S131).

As discussed above, according to the encryption communication system in the second embodiment, the VPN gateway 30 transfers the encryption/decryption keys to the server 10 in the authentication phase (S208). In the data communication phase, the encryption/decryption processes are executed between the server 10 and the client 20. This eliminates the necessity of the encryption/decryption processes in the VPN gateway 30 in the data communication phase.

Further, according to the encryption communication system in the second embodiment, an access request and a response frame thereto are unnecessary between the client 20 and the VPN gateway 30 and between the VPN gateway 30 and the server 10. Therefore, it is possible to reduce the encryption/decryption processes of the VPN gateway 30 to a greater degree.

Concretely, the authentication procedures are reduced from twice to once, thereby making unnecessary the access request and the response frame thereto between the client 20 and the VPN gateway 30 and between the VPN gateway 30 and the server 10. Hence, it is feasible to reduce the encryption/decryption processes of the VPN gateway 30 to the greater degree.

Third Embodiment

Next, the encryption communication system will be described with reference to the drawings by way of a third embodiment of the invention.

The discussion in the first embodiment is that the key is generated between the client 20 and the VPN gateway 30 and is then transferred to the server 10. In the third embodiment, as a substitute for this scheme, a key generation frame to be transmitted by the client 20 is transferred to the server 10, and a key generation frame to be transmitted by the server 10 is transferred to the client 20.

FIG. 6 is an explanatory diagram of an outline of architecture of the encryption communication system in the third embodiment.

As shown in FIG. 6, the encryption communication system in the third embodiment further includes, in addition to substantially the same architecture of the encryption communication system in the second embodiment, a common key transfer unit 40, an identifier generation unit 41 and an identifier transfer unit 42. Other configurations are the same as those explained in the first and second embodiments, and hence the same numerals are employed with omission of the explanations thereof.

The common key transfer unit 40 is a block for transferring the frame containing the common key between the server and the client. The common key transfer unit 40, when receiving the frame containing the common key from the client side, rewrites its address and transfers this frame to the server side. Further, the common key transfer unit 40 transfers an identifier generation request to the identifier generation unit. The common key transfer unit 40, upon receiving a frame other than those described above from the client side, transfers this frame to the client-side transmitting/receiving unit. The common key transfer unit 40, when receiving the frame containing the common key from the server side, rewrites its address and transfers this frame to the client side.

The identifier generation unit 41 is a block for generating an identifier utilized in the data communication phase. The identifier generation unit 41, when receiving the identifier generation request from the common key transfer unit, generates a session identifier afresh and transfers this identifier to the identifier transfer unit.

The identifier transfer unit 42 is a block for generating a frame for transmitting the identifier. The identifier transfer unit 42, upon receiving the session identifier generated by the client from the shared key+identifier generation unit, encrypts this identifier with the server public key and sends the encrypted identifier to the server side.

Next, an operation of the encryption communication system having the architecture described above will be explained with reference to the drawings.

FIG. 7A and FIG. 7B are explanatory sequence diagrams of the operation in the third embodiment. Note that the following processes are actualized by respective predetermined programs being read by the client 20, the VPN gateway 30 and the server 10.

(Client⇒VPN Gateway Authentication Phase)
(Client Access Authentication to Intranet)

In the client 20, the following process is executed for authenticating the access to the Intranet (S300).

The user identifier UID1 is encrypted with the VPN gateway public key KeyG2. Assembled is a frame (which is also referred to as an IP packet. The same connotation will hereinafter be applied) containing this encrypted user identifier UID1 and assigned the session identifier SID1. This frame is transmitted as addressed to the VPN gateway 30 (S301). To be specific, a source IP address (the IP address of the client 20) "20.0.0.1" and a destination IP address (the IP address of the VPN gateway 30) "30.0.0.1" are set in this frame, and this frame with the setting of these IP addresses is sent onto the Internet.

In the VPN gateway 30, the following process is performed for authenticating the access to the Intranet (S302).

The frame transfer unit 31, when receiving the frame, reads the session identifier SID1 from this receipt frame. The session recording module 32 is searched through, wherein this session identifier SID1 is used as a key. At this point of time, there exist none of entries. Therefore, this receipt frame is transferred directly to the client-side transmitting/receiving unit 34.

The client-side transmitting/receiving unit 34, as this receipt frame is the frame encrypted with the VPN gateway public key KeyG2, decrypts this receipt frame with the secret key KeyP2 of this receipt frame itself. The user identifier UID1 is thereby acquired.

The client-side transmitting/receiving unit 34 transfers the user identifier UID1 and the identifier (192.168.0.2) of the server 10 that are contained in the decrypted frame to the access permission notifying unit 38.

The access permission notifying unit 38 searches through the access permission retaining module 39. Herein, the user identifier UID1 and the identifier (192.168.0.2) of the server 10 are registered, and it is assumed that [permitted] is entered. In this case, a result of the authentication about the user identifier UID1, etc is registered as being [permitted], and therefore the access permission notifying unit 38 sends an authentication result notification (an access permission notification) as addressed to the client 20 (S303). Namely, the source IP address (the VPN gateway 30) "30.0.0.1" and the destination IP address (the client 20) "20.0.0.1" are set in the frame containing the authentication result, and this frame with the setting of these IP addresses is sent onto the Internet.

The client 20 receives the authentication result notification (the access permission notification), thereby recognizing that the access authentication to the Intranet and the access authentication to the sever 10 are established.

(Exchange of Common Key with Client)

Next, in the client 20, the following process is executed in order to exchange the common key (S304).

The common key KeyS1 is generated. This is the known technology. The common key and the session identifier are encrypted with the VPN gateway public key KeyG2. Assembled is a frame (which is also called an IP packet. The same connotation will hereinafter be applied) containing the encrypted common key and session identifier and assigned the session identifier SID1 in the authentication phase. This frame is transmitted as addressed to the VPN gateway 30.

In the VPN gateway 30, the following process is conducted for exchanging the common key (S306).

The frame transfer unit 31 thereof, upon receiving the frame, reads the session identifier SID1 from this receipt frame. The session recording module 32 is searched through, wherein this session identifier SID1 is used as a key. At this point of time, there exist none of entries. Hence, this receipt frame is transferred directly to the common key transfer unit 40.

The common key transfer unit 40, the receipt frame being the frame encrypted with the public key of the VPN gateway 30, therefore decrypts this frame with its own secret key KeyP2. The common key KeyS1 is thereby acquired.

The common key transfer unit 40 notifies the identifier generation unit 41 of the identifier generation request. The identifier generation unit 41 generates a session identifier SID3 afresh, and transfers this identifier to the identifier transfer unit 42. The identifier transfer unit 42 encrypts the session identifier SID3 with the public key KeyG3 of the server 10. Assembled is a frame (which is also called an IP packet. This connotation will hereinafter be applied) containing the encrypted session identifier SID3 and assigned the session identifier SID2. This frame is transmitted as addressed to the server 10 (S307). To be specific, a source IP address (the IP address of the VPN gateway 30) "192.168.0.1" and a destination IP address (the IP address of the server 10) "192.168.0.2" are set in this frame, and this frame with the setting of these IP addresses is sent onto the Intranet.

The common key transfer unit 40 encrypts the acquired common key KeyS1 with the public key KeyG3 of the server 10. Assembled is a frame (which is also called an IP packet. This connotation will hereinafter be applied) containing the encrypted common key KeyS1 and assigned the session identifier SID2 in the authentication phase. This frame is transmitted as addressed to the server 10 (S308).

The following process is executed in the server 10 (S309).

The frame receiving unit 12 thereof receives and decrypts those two frames with its own secret key KeyP3.

The frame transmitting unit 11 receives a new common key KeyS2 from the key generation unit 13 (S310), and encrypts this common key KeyS2 with the public key KeyG2 of the VPN gateway 30. Assembled is a frame (which is also called an IP packet. This connotation will hereinafter be applied) containing the encrypted common key KeyS2 and assigned the session identifier SID2 in the authentication phase. This frame is transmitted as addressed to the VPN gateway 30 (S311). To be specific, a source IP address (the IP address of the server 10) "192.168.0.2" and a destination IP address (the IP address of the VPN gateway 30) "192.168.0.1" are set in this frame, and this frame with the setting of these IP addresses is sent onto the Intranet.

Through S304-S310, the transfer of the common key, etc to the server 10 is finished. At a point of time when finishing the transfer of the common key, etc, it follows that the server 10 retains the common key KeyS1, the common key KeyS2 and the session identifier SID3.

In the VPN gateway 30, the following process is executed (S312).

The frame transfer unit 31 thereof, when receiving the frame, searches through the session recording module 32 by use of the session identifier SID2 contained in the receipt frame. At this point of time, there exist none of entries. Hence, this receipt frame is transferred directly to the common key transfer unit 40. Further, the session recording module 32 is recorded with the session identifier SID3 in the data communication phase, the IP address (192.168.0.2) of the server10 and the address (20.0.0.1) of the client 20.

The common key transfer unit 40, the receipt frame being the frame encrypted by the public key of the VPN gateway 30, therefore decrypts this frame with its own secret key (KeyP2). The common key KeyS2 is thereby acquired.

The common key transfer unit 40 encrypts the acquired common key KeyS2 and the acquired session identifier SID3 in the data communication phase by use of the public key KeyG3 of the client 20. Assembled is a frame (which is also called an IP packet. This connotation will hereinafter be applied) containing the encrypted common key KeyS2, etc and assigned the session identifier SID1 in the authentication phase. This frame is transmitted as addressed to the client 20 (S313).

The client 20 receives the common key frame and decrypts this frame with its own secret key KeyP1, thereby acquiring the common key KeyS2 and the session identifier SID3 (S314).

With the processes executed above, the exchange of the common key, etc with the client 20 is finished. At the point of time when finishing the exchange of the common key, etc, it follows that the client 20 retains the common key KeyS1, the common key KeyS2 and the session identifier SID3 in the same way as the server 10 does.

Hereafter, as in the first and second embodiments, the data communications are performed between the client 20 and the server 10 via the VPN gateway 30 (S122 through S131).

As discussed above, according to the encryption communication system in the third embodiment, in the authentication phase, the VPN gateway 30 transfers the encryption/decryption keys to the server 10 (S308). In the data communication phase, the encryption/decryption processes are executed between the server 10 and the client 20. This makes unnecessary the encryption/decryption processes of the VPN gateway 30 in the data communication phase.

Further, according to the encryption communication system in the third embodiment, the encryption key and the decryption key are generated between the client 20 and the server 10, thereby eliminating the necessity for the VPN gateway 30 to execute the process of generating the keys. With this scheme, particularly when the traffic concentrates on the VPN gateway 30 because of there being the large numbers of servers 10 and clients 20, it is possible to reduce the load on the VPN gateway 30.

Fourth Embodiment

Next, the encryption communication system will be described by way of a fourth embodiment of the invention with reference to the drawings.

In the first embodiment, for example, when the plurality of clients 10 access the specified server 10 many times, it is required that the encryption VPN session be established based on the public key encryption method between the VPN gateway 30 and the server 10 each time the client 20 accesses.

In the fourth embodiment, for avoiding this load, the encryption VPN session using the common key is previously established between the server 10 and the VPN gateway 30, wherein the encryption session is used for transferring the common key from the client 20 from this onward.

FIG. 8 is an explanatory diagram of an outline of architecture of the encryption communication system in the fourth embodiment.

As illustrated in FIG. 8, the encryption communication system in the fourth embodiment further includes, in addition to substantially the same architecture of the encryption communication system in the first embodiment, an already-generated session recording module 43 and a pre-session generation unit 44. Other configurations are the same as those explained in the first embodiment, and hence the same numerals are used with omission of their explanations.

The already-generated session recording module 43 is a database for retaining the once-established (generated) encryption VPN session between the VPN gateway 30 and the server 10 by recording the session identifier SID and the common key.

The pre-session generation unit 44 is a block for previously generating (establishing) the VPN session with the server 10. The pre-session generation unit 44 encrypts the user identifier of the VPN gateway 30 with the public key of the server 10 and sends the encrypted identifier to the server 10. The pre-session generation unit 44, when receiving the authentication permission notification from the side of the server 10, generates the session identifier and the common key afresh, and sends the identifier and the key to the server 10. The pre-session generation unit 44, when receiving the common key from the side of the server 10, records the received common key and the self-generated session identifier SID and common key in the already-generated session recording module 32.

Next, an operation of the encryption communication system having the architecture described above will be explained with reference to the drawings. Note that the following processes are actualized by respective programs being read by the (VPN Gateway ⇒ Serve Authentication Phase)

In the VPN gateway 30, the following process is executed beforehand (before, for example, S100 in the first embodiment) in order to establish the encryption VPN session with the server 10 by use of the common key.

The pre-session generation unit 44 thereof encrypts the user identifier UID3 of the VPN gateway 30 with the public key KeyG3 of the server 10. Assembled is a frame (which is also called an IP packet. This connotation will hereinafter be applied) containing the encrypted user identifier UID3 and assigned the session identifier SID2 in the authentication phase. This frame is transmitted as addressed to the server 10. To be specific, a source IP address (the IP address of the VPN gateway 30) "192.168.0.1" and a destination IP address (the IP address of the server 10) "192.168.0.2" are set in this frame, and this frame with the setting of these IP addresses is sent onto the Intranet.

The following process is executed in the server 10.

The frame receiving unit 12 thereof, when receiving the authentication frame, this receipt frame being the frame encrypted with the public key KeyG3 of this frame itself, therefore decrypts this receipt frame with its own secret key KeyP3. The user identifier UID3 is thereby acquired.

The frame transmitting unit 11 checks whether or not the user identifier UID3 is a piece of accessible authentication data registered in the server 10. If an authentication result proves to be permitted, the frame transmitting unit 11 assembles a frame (which is also called an IP packet. This connotation will hereinafter be applied) containing the authentication result and assigned the session identifier SID2. The frame transmitting unit 11 sends this frame addressed to the VPN gateway 30. Namely, the source IP address (the IP address of the server 10) "192.168.0.2" and the destination IP address (the IP address of the VPN gateway 30) "192.168.0.1" are set in this frame, and this frame with the setting of these IP addresses is sent onto the Intranet.

The VPN gateway 30 receives the notification (permission) of the authentication result, thereby recognizing that the access authentication to the server 10 is established.

In the VPN gateway 30, the following process is executed.

The frame transfer unit 31 thereof, when receiving the frame, reads the session identifier SID2 from the receipt frame. The session recording module 32 is searched through, wherein this session identifier SID2 is used as a key. At this point of time, there exist none of entries. Hence, this receipt frame is transferred directly to the pre-session generation unit.

The pre-session generation unit 44 newly generates a session identifier SID4 and the common key KeyS3, and encrypts these identifier and key with the public key KeyG3 of the server 10. Assembled is a frame containing the encrypted session identifier SID4 and assigned the session identifier SID2 in the authentication phase. This frame is transmitted as addressed to the server 10. To be specific, the source IP address (the IP address of the VPN gateway 30) "192.168.0.1" and the destination IP address (the IP address of the server 10) "192.168.0.2" are set in this frame, and this frame with the setting of these IP addresses is sent onto the Intranet.

In the server 10, the following process is executed.

The frame receiving unit 12 thereof receives the authentication frame and decrypts this receipt frame with its own secret key KeyP3. The session identifier SID4 and the common key KeyS3 are thereby acquired.

The frame transmitting unit 11 encrypts a common key KeyS4 with the public key KeyG2 of the VPN gateway 30 and assigns the session identifier SID2 to the frame, and transmits this frame of which the source IP address is "192.168.0.2" and the destination IP address is "192.168.0.1".

The following process is carried out in the VPN gateway.

The frame transfer unit 31 thereof, upon receiving the frame, searches through the session recording module by use of the session identifier SID2 contained in the receipt frame. At this point of time, there exist none of entries. Therefore, the receipt frame is transferred directly to the pre-session generation unit.

The pre-session generation unit 44 decrypts the receipt frame with its own secret key (KeyP2). The common key KeyS4 is thereby acquired. The pre-session generation unit 44 transfers the common keys (KeyS3, KeyS4) and the session identifier (SID4) to the already-generated session recording module 43.

In the subsequent processes, the encryption communication from the VPN gateway 30 to the server 10 is replaced by a common key communication. Namely, in the case of being directed to the server 10 from the VPN gateway 30, the processes become the same as the processes in which the public key KeyG3 and the secret key KeyP3 are replaced by the common key KeyS3. In the case of being directed to the VPN gateway 30 from the server 10, the processes are the same as the processes in which the public key KeyG2 and the secret key KeyP3 are replaced by the common key KeyS4.

As discussed above, according to the encryption communication system in the fourth embodiment, the session between the VPN gateway 30 and the server 10 can be repeatedly utilized as described above. This enables the reduction of the encryption/decryption processes in the VPN gateway 30.

Concretely, the scheme that the common key session between the VPN gateway 30 and the server 10 can be re-utilized when the plurality of clients 20 access the same server 10, makes it possible to reduce the encryption/decryption processes in the VPN gateway 30 by replacing the encryption process based on the public key encryption method between the VPN gateway 30 and the server 10 with by the common key encryption method. This is because the common key encryption method requires a smaller amount of calculation (a lighter encryption algorithm) than by the public key encryption method.

Fifth Embodiment

Next, the encryption communication system will be described by way of a fifth embodiment of the invention with reference to the drawings.

Generally, if the data communications are performed for a long period of time by use of the same common key, there arises such a problem in terms of security as to cause a rise in the probability that a content of the communication might be decrypted and so on. Hence, a countermeasure such as periodically exchanging the key is needed. In the network in the first embodiment, it is required that the session identifier for the post-exchange key be newly generated for enabling each node to discriminate the post-exchange key from the pre-exchange key and to use the different encryption and decryption keys. Therefore, in the fifth embodiment, the server 10 or the client 20 notifies the VPN gateway of the new session identifier at timing when changing the common key.

FIG. 9 is an explanatory diagram of an outline of architecture of the encryption communication system in the fifth embodiment. As illustrated in FIG. 9, in the encryption communication system in the fifth embodiment, in addition to substantially the same architecture of the encryption communication system in the first embodiment, the VPN gateway 30 further includes a new identifier registration module 45, and the server 10 further includes a new identifier notifying unit 14, a new common key transfer unit 15 and a new common key generation unit 16. Other configurations are the same as those explained in the first embodiment, and hence the same numerals are used with omission of their explanations.

The new identifier registration module 45, when receiving anew identifier, deletes the old common key identifier SID entered in the entry of the session recording module 32 and inserts, as a substitute for this, a new common key identifier SID.

The new common key generation unit 16 generates a new common key and a new identifier, and transfers the key and identifier to the new common key transfer unit 15 and the new identifier notifying unit 14.

The new common key transfer unit 15 encrypts the common key and the identifier with the old common key, and transmits the encrypted key and identifier to the client.

The new identifier notifying unit 14, when receiving the new common key from the client, sends the new identifier to the VPN client.

Given hereinafter is an explanation of an example of exchanging the common key from the side of the server in the data communication phase in the first embodiment. An assumption is that the client 20 executes a process of doing the encryption with the key KeyS1 and the decryption with the key KeyS2, while the server 10 encrypts by use of KeyS2 and decrypts by use of KeyS1.

In the server 10, the following process is conducted.

The new common key generation unit 16 newly generates a common key KeyS7 and a session identifier SID7, and transfers these key and identifier to the new common key transfer unit 15 and the new identifier notifying unit 14.

The new common key transfer unit 15 encrypts KeyS7 and SID7 with the common key KeyS2, and sends the frame together with the session identifier SID3 as addressed to the VPN gateway (192.168.0.1).

In the VPN gateway 30, the following process is executed.

The frame transfer unit 31, when receiving the frame, searches the session recording module 32 for an entry (value) associated with the session identifier SID3 contained in the receipt frame, thereby reading an IP address (20.0.0.1) of the client.

The frame transfer unit 31 rewrites the source IP address and the destination IP address of the receipt frame into a source IP address "30.0.0.1" and a destination IP address "20.0.0.1", and sends the frame with the rewritten addresses toward the client 20.

In the client 20, the next process is executed.

The client 20 receives the frame, executes a decryption process using the decryption common key KeyS2 associated with the session identifier SID3 of this receipt frame, and acquires the common key (KeyS7) and the session identifier SID7. The client 20 generates a common key KeyS8 afresh. The client 20 encrypts this common key KeyS8 with the common key KeyS2. The client 2 assembles a frame containing this encrypted common key and assigned the session identifier SID3. This frame is transmitted as addressed to the VPN gateway (30.0.0.1).

In the VPN gateway 30, the next process is carried out.

The frame transfer unit 31 thereof, when receiving the frame, searches the session recording module for an entry (value) associated with the session identifier SID3 contained in the receipt frame, thereby reading a server IP address (192.168.0.2).

The frame transfer unit 31 rewrites the source IP address and the destination IP address of the receipt frame into a source IP address "192.168.0.1" and a destination IP address "192.168.0.2", and sends the frame with the rewritten addresses toward the server.

The next process is carried out in the server 10.

The frame receiving unit 12 thereof receives the frame, and executes the decryption process using the decryption common key KeyS1 associated with the session identifier SID3 of this receipt frame, and acquires a new common key KeyS7.

The new identifier notifying unit 14 sends the new identifier SID7 and the old session identifier SID3 that are addressed to the VPN gateway (192.168.0.1).

In the VPN gateway 30, the next process is executed.

The frame transfer unit 31 thereof receives the frame and transfers this receipt frame to the new identifier registration module 45.

The new identifier registration module 45 rewrites the session identifier SID3 entered in the entry of the old session identifier SID3 in the session recording module 32, into the new session identifier SID7.

Hereafter, the communications are performed by use of the new common keys (KeyS7, KeyS8) and the new session identifier SID7 in place of the old common keys (KeyS1, KeyS2) and the old session identifier SID3.

As discussed above, according to the encryption communication system in the fifth embodiment, the client 20 and the server 10 can transmit and receive the frame by use of the new common keys and the new session identifier. Further, the key in the data communication phase can be periodically changed between the client 20 and the server 10, thereby decreasing the probability that the encrypted frame might be decrypted by the third party, and improving the security in the data communication phase.

The invention can be carried out in a variety of forms without deviating from the spirit and the principal features thereof. Accordingly, the embodiments are nothing but the simple exemplifications in every aspect. The invention should not be construed limitedly by the descriptions thereof.

INDUSTRIAL APPLICABILITY

It is possible to reduce the load of the encryption/decryption processes in the communication relay device (e.g., the VPN gateway) that connects the first network (e.g., the Internet. and the second network (e.g., the Intranet.)

What is claimed is:

1. A communication system, comprising:

a communication relay device including;

a first computer communication unit communicating with a first computer and receiving a first common key from the first computer by a public key encryption method, a key generation unit generating a second common key, a second computer communication unit communicating with a second computer and transmitting the first common key and the second common key to the second computer by a public key encryption method; and the second computer including;

a receiving unit receiving a first frame from the first computer via the communication relay device and decrypting the first frame using the first common key by a common key encryption method, a transmitting unit encrypting a second frame using the second common key by the common key encryption method and transmitting the second frame to the first computer via the communication relay device.

2. A communication system, comprising:

a communication relay device includes a first computer communication unit communicating with a first computer and receiving a first common key from the first computer by a public key encryption method, a second computer communication unit communicating with a second computer and transmitting the first common key to the second computer by a public key encryption method; and the second computer includes a key generation unit generating a second common key, a receiving unit receiving a first frame from the first computer via the communication relay device and decrypting the first frame using the first common key by a common key encryption method, a transmitting unit transmitting the second common key to the communication relay device, encrypting a second frame using the second common key by the common key encryption method, and transmitting the second frame to the first computer via the communication relay device, wherein the second computer communication unit receiving the second common key from the second computer by the public key encryption method, wherein the first computer communication unit transmitting the second common key to the first computer by the public key encryption method.

* * * * *